(12) United States Patent
Hoops et al.

(10) Patent No.: US 9,101,830 B1
(45) Date of Patent: Aug. 11, 2015

(54) MOTION-RESPONSIVE ENTERTAINMENT GARMENT

(71) Applicants: Hilary Hoops, Fairfax, VA (US); Tyson Liotta, Rockville, MD (US)

(72) Inventors: Hilary Hoops, Fairfax, VA (US); Tyson Liotta, Rockville, MD (US)

(73) Assignee: Geeknet, Inc., Fairfax, VA (US)

( * ) Notice: Subject to any disclaimer, the term of this patent is extended or adjusted under 35 U.S.C. 154(b) by 0 days.

(21) Appl. No.: 13/854,504

(22) Filed: Apr. 1, 2013

Related U.S. Application Data

(60) Provisional application No. 61/618,644, filed on Mar. 30, 2012.

(51) Int. Cl.
*A63F 9/24* (2006.01)
*A63F 13/20* (2014.01)

(52) U.S. Cl.
CPC ..................................... *A63F 13/06* (2013.01)

(58) Field of Classification Search
CPC ............. A63F 9/18; A63F 9/00; A63B 67/00; A63B 71/00
USPC ....................................................... 273/440
See application file for complete search history.

(56) References Cited

U.S. PATENT DOCUMENTS

2011/0045736 A1* 2/2011 Wooten .......................... 446/397

\* cited by examiner

*Primary Examiner* — Reginald Renwick
(74) *Attorney, Agent, or Firm* — R. Stevan Coursey, Esq.; Arnall Golden Gregory LLP

(57) ABSTRACT

The disclosure describes a motion-responsive entertainment garment, including apparatuses and methods, for wearing and hands-free use by a user in connection with the playing of a game and that detects and identifies pre-defined movements, or pre-defined patterns of movements, of the user's arms and/or hands associated with the game and produces corresponding pre-defined sound and/or lighting effects in response thereto. According to an example embodiment, the motion-responsive garment comprises a garment having an electronic controller with a speaker for producing pre-defined sound effects, one or more accelerometers communicatively connected to the controller and configured to produce output data in response to and representative of movement of the garment user's arms and/or hands, and one or more light emitting devices configured to produce pre-defined lighting effects. By producing the sound and lighting effects, the garment enhances the game not only for the garment's user, but also for the other game participants.

20 Claims, 15 Drawing Sheets

| MOTION EVENT CODE | MOTION EVENT | OPERATING MODE NO. |
|---|---|---|
| 1 | SHARP JERKING MOTION OF ARMS AND/OR HANDS | 1 |
| 2 | RAISING OF ARMS AND/OR HANDS | 2 |
| 3 | OUTSTRETCHING OF ARMS AND/OR HANDS – PALMS UP | 3 |
| 4 | ROTATION OF PALMS FROM UP TO DOWN | 4 |
| 5 | LOWERING OF ARMS AND/OR HANDS | 5 |

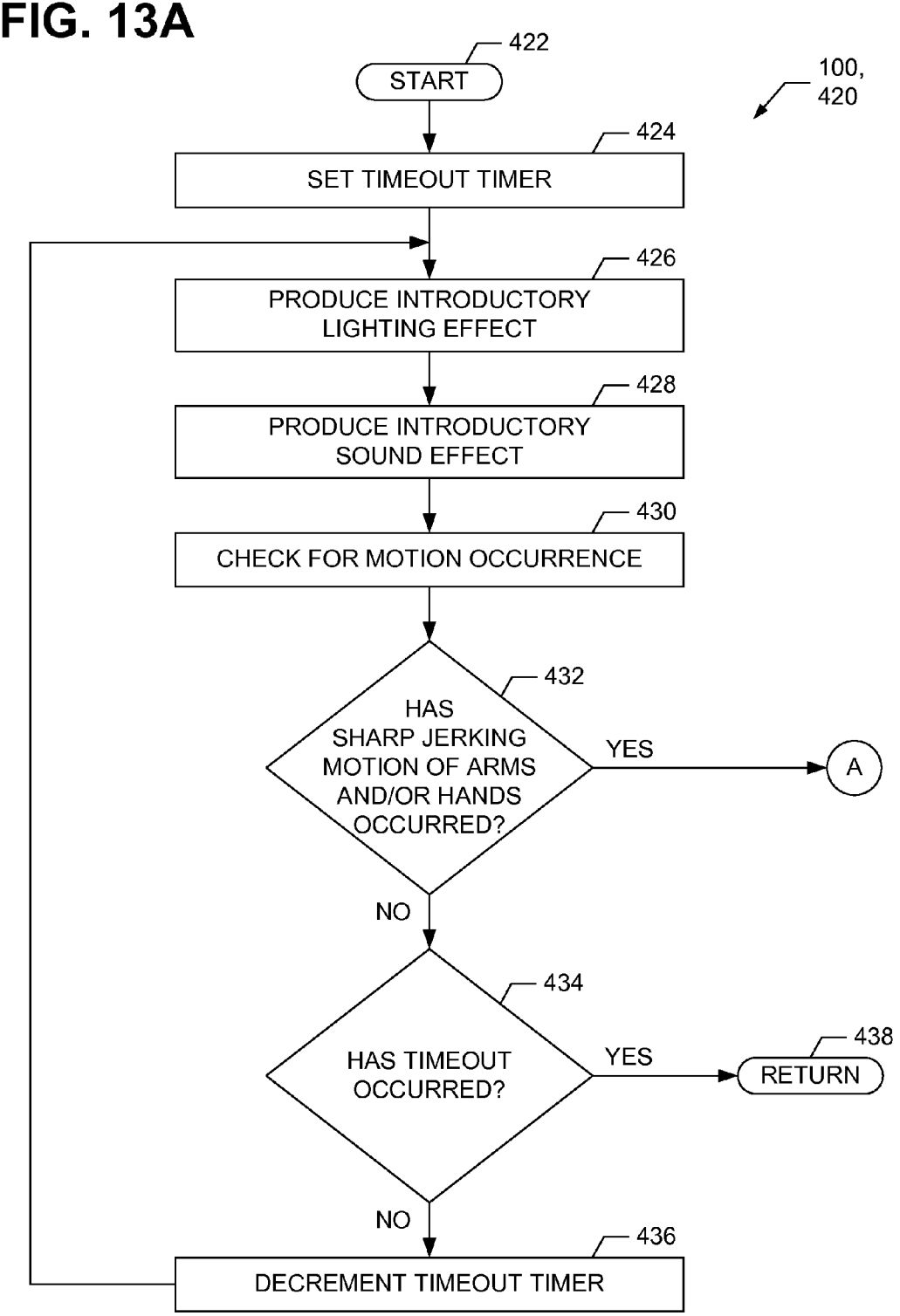

MOTION-RESPONSIVE ENTERTAINMENT GARMENT

CROSS REFERENCE TO RELATED APPLICATION

This application claims the benefit of priority to and incorporates herein by this reference in its entirety, U.S. provisional patent application Ser. No. 61/618,644, which is entitled "Motion-Responsive Entertainment Garment" and filed on Mar. 30, 2012.

FIELD OF THE INVENTION

The present invention relates, generally to the field of systems, including apparatuses and methods, for human entertainment and, more particularly including, interactive electronic toys.

BACKGROUND

With the advent of motion-based technology, accelerometers have become commonly used in many devices. Accelerometers measure forces (often referred to as "G forces") produced by motion of the devices in one, two or three axes. Data and information from the accelerometers representative of the forces may be input to a microprocessor, which upon executing appropriate programming and through use of various assumptions, can determine how the accelerometers and, hence, the devices are being moved. The data and information may also be used, in connection with a microprocessor, to detect the starting or stopping of such motion. When a microprocessor is additionally programmed with and executes game software, the microprocessor can utilize the generated knowledge related to the motion of a device to enable and provide interaction with the game software. Current examples of such use of accelerometers and devices in conjunction with game software include the Wii™ entertainment console and remote controller of Nintendo of America, Inc., and the iPhone® and iPad® of Apple, Inc.

Unfortunately, the Wii™ remote controller, iPhone® and iPad® are not worn by a user and generally require a user to hold them directly in the user's hand(s) or indirectly via an interface device (such as a toy steering wheel, tennis racket, golf club, or fishing rod) that is held in the user's hand(s). Regardless of whether an interface device is employed or not, the user's hand(s) are generally not usable for any other purpose while playing a game. Additionally, visual output in connection with a game being played and in response to motion of the user's hands is typically limited to changes in video or images being displayed a display or television screen. Thus, there is no visual output changing the way in which another game participant actually and physically perceives the user.

Therefore, there is a need in the industry for a wearable entertainment garment that frees a user's hands for other uses while playing a game, detects and senses motion of a user's hands, and responds to such motion by providing visual output that changes the way in which other game participants actually and physically perceive the user.

SUMMARY

Broadly described, the present invention comprises a motion-responsive entertainment garment, including apparatuses and methods, for wearing and hands-free use by a user in connection with the playing of a game and that detects and identifies pre-defined movements, or pre-defined patterns of movements, of the user's arms and/or hands associated with the game and produces corresponding sound and/or lighting effects in response thereto. According to an example embodiment and without limitation, the motion-responsive garment comprises a garment having an electronic controller with a speaker for producing sound effects, one or more accelerometers communicatively connected to the controller and configured to produce output data in response to and representative of movement of the garment user's arms and/or hands, and one or more light emitting devices configured to produce lighting effects. Using at least the accelerometer data and other motion related data, the garment is operative to detect and identify pre-defined movements or patterns of movements of the user's arms and/or hands that correspond to movements, patterns of movements, and/or gestures associated with and required by a game being played by the user. The garment is also operative to produce, or not produce, pre-defined sound and/or lighting effects generally associated with and in response to identifying such movements, patterns of movements, and/or gestures.

Advantageously, the motion-responsive entertainment garment renders the user's hands free for uses other than holding a remote controller during the playing of a game, while still detecting and sensing the movements of the user's arms and/or hands during such game. Also, the motion-responsive entertainment garment's production of pre-defined sound and/or light effects associated with the game being played and with the user's movements during playing of the game enhances the realism of the game and the user's interaction with other game participants.

Other uses and benefits of the present invention may become apparent upon reading and understanding the present specification when taken in conjunction with the appended drawings.

BRIEF DESCRIPTION OF THE DRAWING

FIGS. 13A, 13B and 13C display a flowchart representation of a method of operation of the motion-responsive entertainment garment of FIG. 1 implemented in connection with a third example operating mode and corresponding operating mode software thereof.

DETAILED DESCRIPTION OF THE INVENTION

Figure 1:
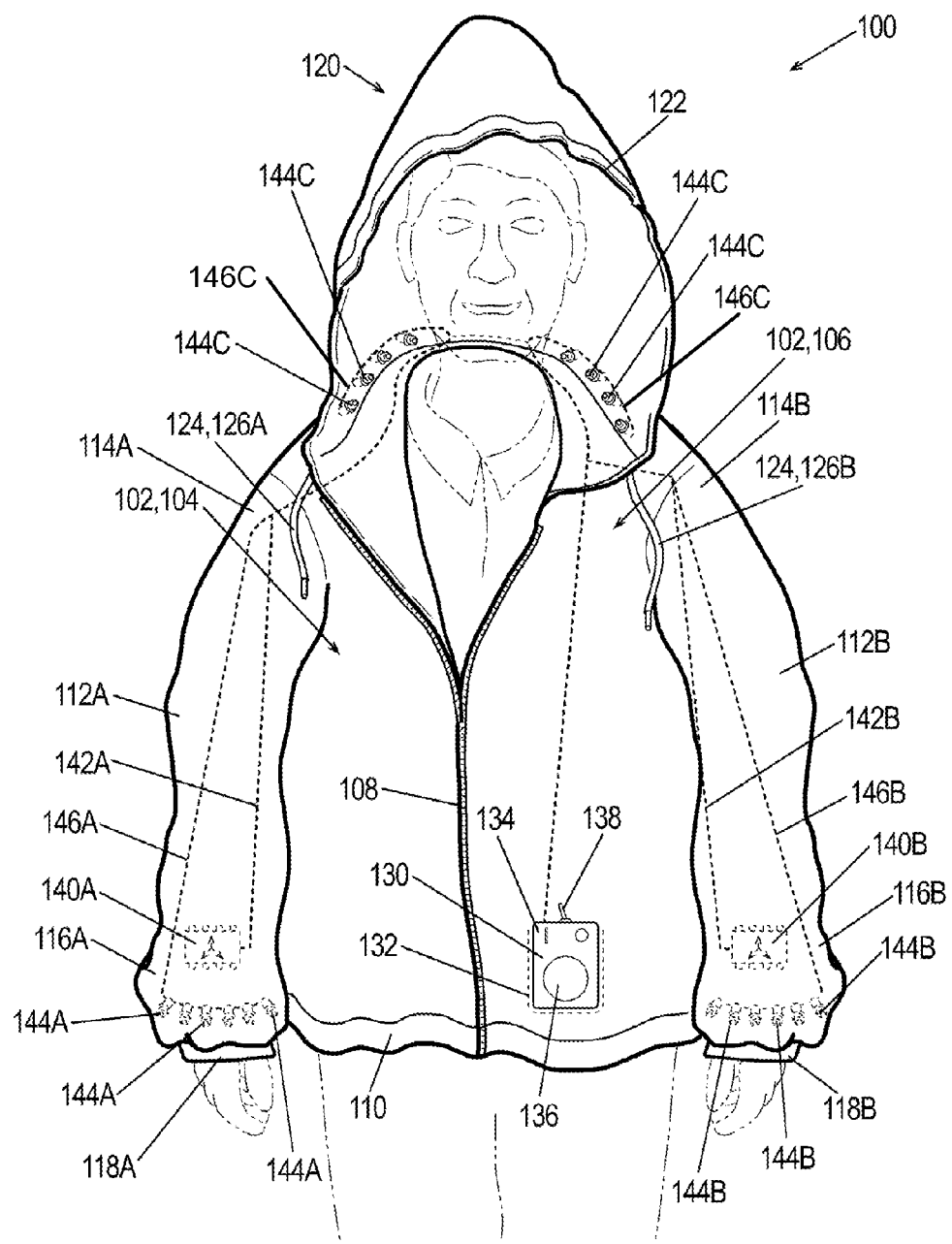
FIG. 1 displays a front, elevational, pictorial view of a motion-responsive entertainment garment, in accordance with an example embodiment of the present invention, to be worn by a human user in connection with the playing of a game.

Referring now to the drawings in which like numerals represent like elements or steps throughout the several views, FIG. 1 displays a motion-responsive entertainment garment 100 according to an example embodiment to be worn by a human user in connection with the playing of a game. The motion-responsive entertainment garment 100 is operable to detect individual pre-defined movements, or motions, of the user's arms and/or hands used in a game, but also to detect pre-defined sequences, or patterns, of movements of the user's arms and/or hands used in a game. In response to detecting either individual or patterns of pre-defined movements of the user's arms and/or hands, the motion-responsive entertainment garment produces pre-defined sound and/or lighting effects 222, 252 (see FIG. 2) or may do nothing. The production of sound and/or lighting effects 222, 252 in coordination with and in response to movements, or motion, of the user's arms and/or hands enhances and renders more realistic the game playing experience not only for the user, but also for others playing the game with the garment's user.

The motion-responsive entertainment garment 100 (sometimes referred to herein as the "garment 100") comprises a body portion 102 that is sized and shaped to substantially receive therein and wrap around, the torso of a user's body. The body portion 102 has a back section (not visible) that resides adjacent to the user's back when the garment 100 is worn, and has right and left front sections 104, 106 that reside, respectively, adjacent to the right and left sides of the user's chest and abdomen. First and second sides of a zipper 108 are secured to opposing edges of the right and left front sections 104, 106 of the body portion 102 and permit the garment 100 to be worn with the right and left front sections 104, 106 joined together when the first and second sides of the zipper 108 are engaged or to be worn apart when the first and second sides of the zipper 108 are not engaged. The body portion 102 has a bottom hem 110 that, according to the example embodiment, does not include elastic, thereby enabling the body portion 102 to fit loosely around the user's torso. It should be understood and appreciated that in other example embodiments, the zipper 108 may be replaced with fasteners (such as, but not limited to, buttons, snaps, and hook and loop fasteners) that enable the right and left front sections 104, 106 of the body portion 102 to be selectively joined together by the user, and the bottom hem 110 may include elastic to cause the bottom hem 110 to fit snugly against the user's torso.

The garment 100 also comprises sleeve portions 112A, 112B having first ends 114A, 114B fixedly attached to the upper part of the garment's body portion 102. The sleeve portions 112A, 112B are sized and shaped in proportion to the body portion 102 and to, respectively, receive therein the user's right and left arms. The sleeve portions 112A, 112B have second ends 116A, 116B with respective cuffs 118A, 118B formed thereat. According to the example embodiment, the sleeve portions 112A, 112B are not tapered between their respective first ends 114A, 114B and second ends 116A, 116B, and the cuffs 118A, 118B are not elasticized. By virtue of the sleeve portions 112A, 112B not being tapered and the cuffs 118A, 118B not being elasticized, a portion of the inside of each sleeve portion 112A, 112B near the respective second end 116A, 116B thereof is visible from outside of the garment 100.

Additionally, the garment 100 includes a hood portion 120 that is secured to the upper part of the body portion 102 for receiving the user's neck and head therein. The hood portion 120 defines an opening 122 that permits the user's face to remain substantially uncovered when the garment 100 is being worn. The hood portion 120 includes a pull cord 124 that extends within the hood portion 120 generally around the opening 122. The pull cord 124 has first and second segments 126A, 126B that protrude from the hood portion 120 on opposite sides thereof. By pulling on the first and second segments 126A, 126B while the garment 100 is being worn, the user can tighten or loosen the hood portion 120 around the user's face. The hood portion 120 and opening 122, in accordance with the example embodiment, are sized and shaped to receive the user's head, but yet blouse outward somewhat around and from the user's face such that a portion of the inside of the hood portion 120 around opening 122 is visible from outside of the garment 100 when the garment 100 is being worn.

In accordance with the example embodiment, the garment 100 resembles an item of clothing outerwear commonly referred to as a "hoodie". However, it should be understood and appreciated that in other embodiments, the garment 100 may resemble, for example and not limitation, a shirt, sweatshirt, jacket, coat, or other clothing item.

The garment 100, according to the example embodiment, is generally manufactured from multiple plies of fabric materials that are secured together. The garment 100 further comprises an electronic controller 130 that is positioned in a pocket 132, or pouch 132, formed by the garment's fabric materials and within the body portion's left front section 104 near the bottom hem 110 thereof. The controller 130 includes an enclosure 134 and a printed circuit board (not visible) housed by the enclosure 134 and having a processing unit 150 (such as, for example and not limitation, a microprocessor or microcontroller) and other electronic components appropriate to provide the garment 100 with the functionality described herein.

The controller 130 also includes a speaker 136, off/on power switch 138, and an electrical power source 184 (such as, for example and without limitation, one or more batteries that are housed at least partially by or that protrude at least partially from enclosure 134). The speaker 136, off/on power switch 138, and electrical power source 184 are electrically and operably connected to the controller's printed circuit board. When the off/on power switch 138 is moved by the user into its "on" position, electrical power is supplied from the electrical power source 184 to the controller's printed circuit board, and the processing unit 150 and other electronic components thereof, rendering the controller 130 operational. Conversely, when the off/on power switch 138 is moved by the user into its "off" position (for instance, when the user desires to stop playing a game), electrical power is not supplied from the electrical power source 184 to the controller's printed circuit board, and the processing unit 150 and other electrical components thereof, rendering the controller 130 non-operational. The speaker 136 is adapted to produce different audible sounds under the control of the controller's processing unit 150 and in response to corresponding electrical signals being received from the processing unit 150 or other electronic components of the controller's printed circuit board. It should be understood and appreciated that in other embodiments, the speaker 136 may be located remotely from the controller 130 in a different area of the garment 100, or the garment 100 may include multiple speakers 136.

Additionally, the garment 100 comprises multiple, three-axis accelerometers 140 with a first accelerometer 140A being secured between plies of the garment's fabric materials at a location near the second end 116A of sleeve portion 112A and cuff 118A. A second accelerometer 140B is secured between plies of the garment's fabric materials at a location near the second end 116B of sleeve portion 112B and cuff 118B. When the garment 100 is worn by the user, the first and second accelerometers 140A, 140B are positioned generally near the user's wrists so as to detect and output data representative of movement, or motion, of the garment 100 (and, hence, of the user's wrists) in three dimensions. The accelerometers 140A, 140B are electrically connected to the controller's printed circuit board for the communication of such data to the controller's printed circuit board via respective electrical wires 142A, 142B (or electrical conductors 142A, 142B) that extend through and between plies of the garment's fabric materials that form the body portion 102 and sleeve portions 112A, 112B of the garment 100. It should be understood and appreciated that while each accelerometer 140A, 140B comprises a three-axis accelerometer in accordance with the example embodiment described herein, each accelerometer 140A, 140B may independently comprise a one-axis, two-axis, or three-axis accelerometer in other embodiments. In such other embodiments, the controller 130 functions in a manner substantially similar to that described herein, but processes data from the accelerometers 140A, 140B with respect to one, two, or three dimensions depending on whether the accelerometers 140A, 140B comprise one-axis, two-axis, or three-axis accelerometers.

Figure 2:
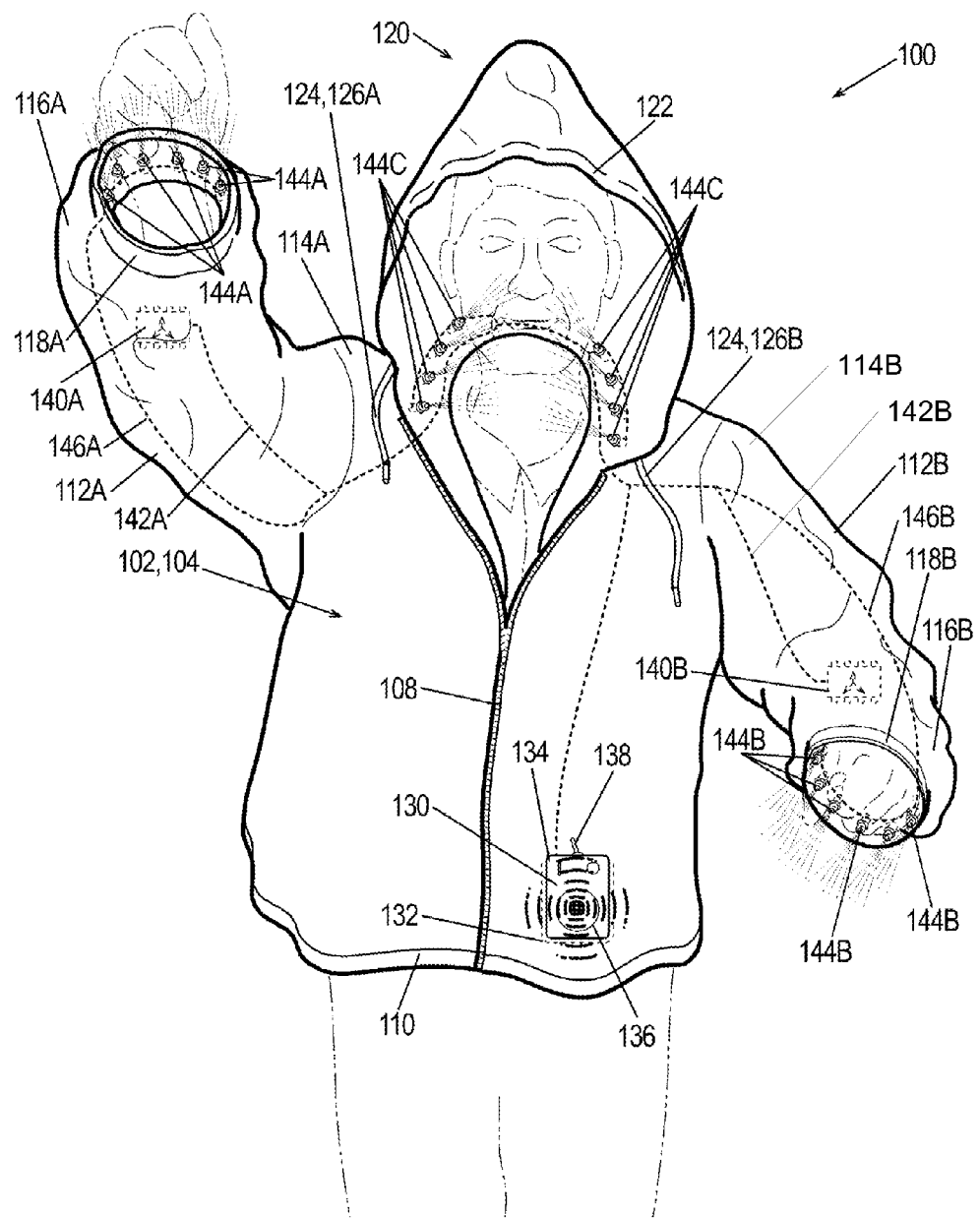
FIG. 2 displays a front, elevational, pictorial view of the motion-responsive entertainment garment of FIG. 1 in operation producing sound and lighting effects in connection with a game being played by the user.

In addition, the garment 100 comprises multiple sets of light emitting devices 144A, 144B, 144C that are, according to the example embodiment, operable to produce and emit multiple colors of light. The first and second sets of light emitting devices 144A, 144B are, respectively, secured to the insides of sleeve portions 112A, 112B near the cuffs 118A, 118B thereof. The first and second sets of light emitting devices 144A, 144B are oriented so that the light that they produce and emit is visible from outside the garment 100 via the openings formed by the cuffs 118A, 118B at the second ends 116A, 116B of sleeve portions 112A, 112B. Light produced and emitted by the first and second sets of light emitting devices 144A, 144B generally illuminates the user's wrists and hands as seen in FIG. 2.

The third set of light emitting devices 144C is secured to the inside of the garment's hood portion 120 near opening 122. The third set of light emitting devices 144C is oriented so that the light that they produce and emit is visible from outside the garment 100 via opening 122 and generally illuminates the user's face and neck as seen in FIG. 2. The light emitting devices 144A, 144B, 144C are electrically connected to the controller's printed circuit board for the receipt of electrical power and/or signals, as appropriate, from the controller 130 via respective electrical wires 146A, 146B, 146C (or electrical conductors 146A, 146B, 146C) to cause the light emitting devices 144A, 144B, 144C to generate light in various colors in response to movement or non-movement of the user's hands and/or arms and in accordance with software programming executed by the controller's processing unit 150.

According to the example embodiment, the light emitting devices 144A, 144B, 144C comprise multi-color light emitting diodes (LEDs). It should be understood and appreciated, however, that in other embodiments, the light emitting devices 144A, 144B, 144C may include other devices (such as, for example and not limitation, fiber optic elements) that may be available now or in the future for producing and/or delivering light having one or more colors.

Figure 3:
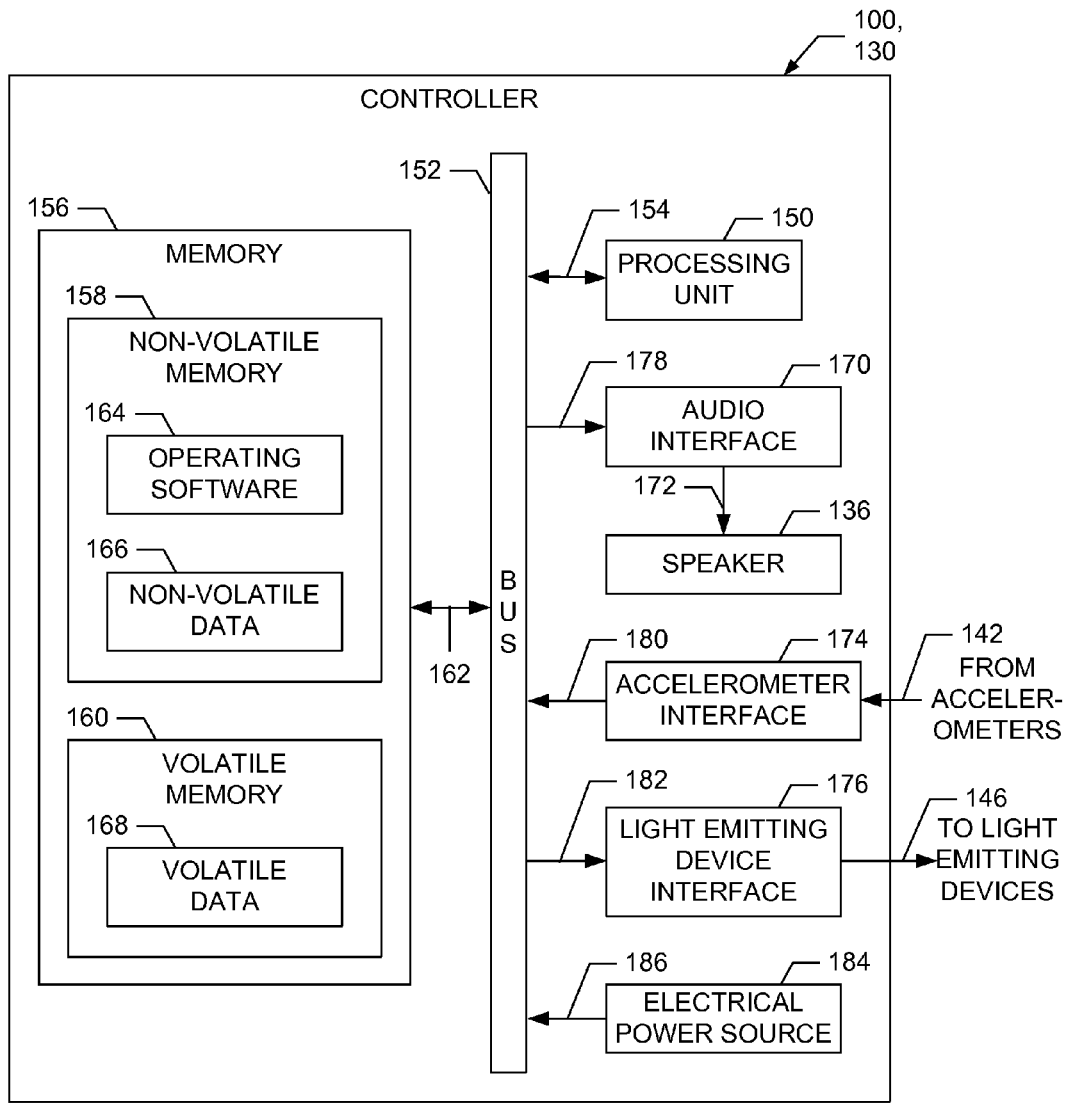
FIG. 3 displays a block diagram representation of a controller of the motion-responsive entertainment garment of FIG. 1.

FIG. 3 displays a block diagram representation of the controller 130 of the garment 100 according to the example embodiment. The controller 130 comprises a processing unit 150 that is communicatively connected to a bus 152 via signal paths 154 for the bi-directional communication of data with other components of the controller 130. The processing unit 150 is adapted to execute computer software instructions, causing the controller 130 and garment 100 to perform as described herein. The processing unit 150 may comprise a microprocessor, microcontroller, arithmetic logic unit (ALU), application specific integrated circuit (ASIC), or other similar electronic device having similar capabilities, alone or in combination. The bus 152 comprises a plurality of bi-directional communication paths for the bi-directional communication of computer software instructions, address, data and various control signals necessary for operation of the controller 130.

The controller 130 also comprises a memory 156, including non-volatile memory 158 and volatile memory 160. The memory 156 is communicatively connected to bus 152 for the bi-directional communication of computer software instructions, address, data and control signals with the bus 152 and other device components connected to the bus 152, through one or more bi-directional signal paths 162. Non-volatile memory 158 generally stores information and/or data that will not be lost when electrical power to the non-volatile memory 158 is removed. Examples of non-volatile memory 158 include, without limitation, flash random access memory devices, battery backed up random access devices, read only memory devices, programmable read only memory devices, electrically programmable read only memory devices, universal serial bus (USB) devices, magnetic disks, optical disks, and other similar or non-similar devices or media available now or in the future. Volatile memory 160 typically stores information and/or data for a temporary period of time, as such information and/or data that will be lost when electrical power is no longer supplied to the volatile memory 160. Examples of volatile memory 160 include, but are not limited to, non-battery backed up random access memory devices.

According to the example embodiment, non-volatile memory 158 stores a plurality of computer software instructions of operating software 164 that, when delivered to and executed by processing unit 150, cause the processing unit 150 and other controller components to perform various actions and provide the basic functionality necessary to implement and support the methods and operations described herein. Execution of the plurality of computer software instructions of the operating software 164 also enables and causes the controller 130 and garment 100 to perform the functions and operations associated with games being played by a user of the garment 100 and to perform according to the methods herein. For example, execution of the operating software 164 causes the controller 130 to receive signals and/or data representative of the movement, or motion, of a garment user's arms and/or hands from the garment's accelerometers 140 and to identify the movement, or motion, as corresponding to a particular motion event. In another example, execution of the operating software 164 causes the controller 130 to produce sound and/or lighting effects 222, 252 according to the operating software 164 in response to detecting a particular motion event or a particular sequence or pattern of multiple motion events, and to generate and communicate electrical signals to the controller's speaker 136 and/or garment's various light emitting devices 144 causing the speaker 136 and/or light emitting devices 144 to produce, or not produce, one or more sound and/or lighting effect(s) 222, 252 appropriate for the motion event(s).

As used herein, the term "motion event" comprises one or more pre-defined movement(s) of a user's arm(s) and/or hand(s) such that detection of a motion event by the controller 130 may cause the controller 130 to operate according to a particular operating mode (or mode of operation) associated with or corresponding to the motion event, may cause the controller 130 to wait for the detection of one or more subsequent motion events before proceeding with other actions in order to require a pattern of movements appropriate for a game, may cause the controller 130 to produce (or cause the production of) one or more sound and/or lighting effect(s) 222, 252, or may cause the processing unit 150 to branch to other portions of the operating software 164. Multiple motion events may be combined into pre-define sequences, or patterns, of motion events and, hence, pre-define sequences, or patterns, of movements of a user's arm(s) and/or hand(s). One or more motion event(s) may comprise and correspond to a gesture appropriate in connection with a game being played by a user wearing the garment 100.

Figures 4, 5:
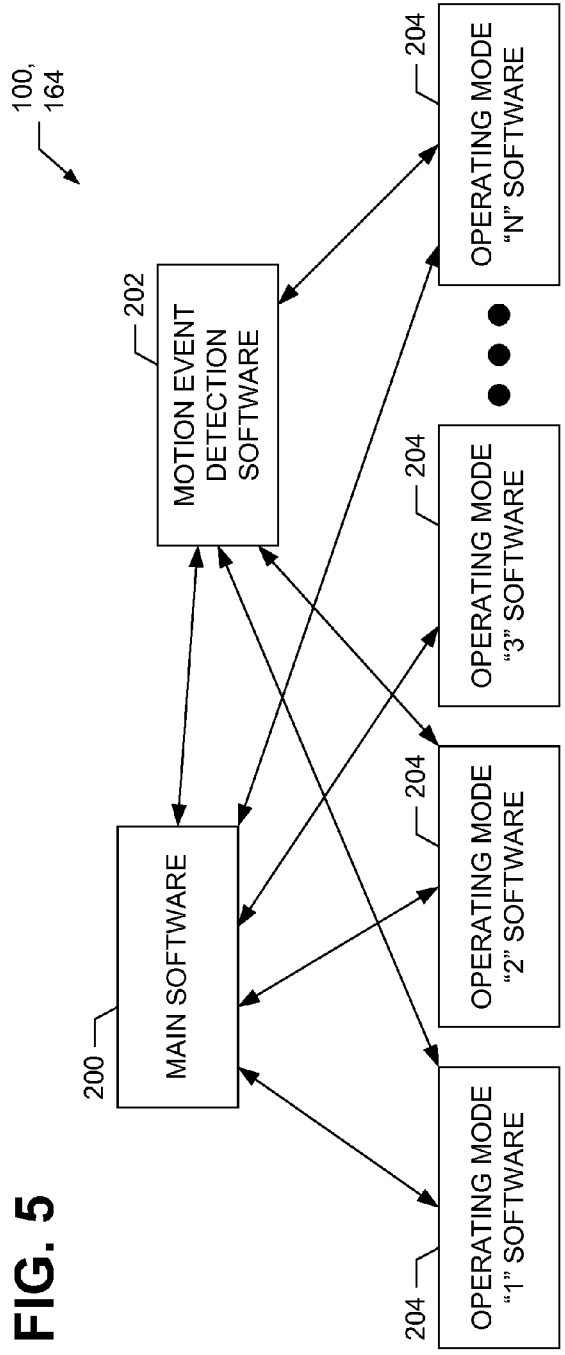
FIG. 4 displays a tabular representation of a sample portion of the motion events of the motion-responsive entertainment garment of FIG. 1 that are detectable and responded to by the garment during use and operation thereof.
FIG. 5 displays a block diagram representation of operating software of the motion-responsive entertainment garment of FIG. 1.

FIG. 4 displays a non-exclusive, non-exhaustive list of different motion events detectable by the controller 130 with the detection of some being used to cause the processing unit 150 to branch to respective operating mode software 204 portions of the operating software 164 identified by a correspondingly associated operating mode number, and the detection of others being required within and by an operating mode as part of a sequence, or pattern, of movements by the user's arm(s) and/or hand(s). Each motion event is uniquely associated with a motion event code and may, or may not, be associated with an operating mode and, therefore, with an operating mode number. It should be understood and appreciated that some motion events require, or correspond to, the movement of both of a user's arms and/or hands in a similar manner, but that other motion events may require, or correspond to, the movement of only one a user's arms and/or hands in particular way. Thus, for example, a first motion event may correspond to a sharp, jerking movement of both of a user's arms and/or hands, while a second motion event may correspond to the rotation of one of a user's hands from having the palm facing upward to having the palm facing downward.

Referring back to FIG. 3 and in addition to the operating software 164, non-volatile memory 158 stores non-volatile data 166 that is used by the processing unit 150 during execution of the operating software 164. Such non-volatile data 166 may include, but not be limited to, data representative of and/or corresponding to pre-defined movements of a garment user's arm(s) and/or hand(s) that is utilized by the processing unit 150 in analyzing received accelerometer data and in detecting and identifying movements of the user's arm(s) and/or hand(s) from the received accelerometer data, and associated motion event code and operating mode number data. The data related to each pre-defined movement of a user's arm(s) and/or hand(s) may comprise, for example and not limitation, spatial and/or directional data describing the pre-defined movement in terms of geometrical movements, coordinates, and/or motion directions of the garment user's arm(s) and/or hand(s), as the case may be. Additionally, the data related to each pre-defined movement of a user's arm(s) and/or hand(s) may further include rate data associated with the spatial and/or directional data and describing the rate at which the garment user's arm(s) and/or hand(s) are moved if such movement is to be interpreted as corresponding to the pre-defined movement.

The non-volatile data 166 may also include, without limitation, data representative of and/or corresponding to pre-defined output events in the form of sound and/or lighting effects 222, 252 to be generated by the controller's speaker 136 and/or the garment's light emitting devices 144 during the playing of a game by the garment's user. The pre-defined output events generally include lighting effects 252, described in greater detail below with respect to FIG. 8, to be produced by one or more of the garment's sets of light emitting devices 144A, 144B, 144C and/or audible sound effects 222, described in greater detail below with respect to FIG. 6, to be produced by the garment's speaker 136. Such lighting effects 252 may comprise, for example and not limitation: turning on and turning off of the light emitting devices 144A, 144B, 144C alone, in combination, and/or in various sequences; rapid flashing of the light emitting devices 144A, 144B, 144C alone, in combination, and/or in various sequences; changing the color of the light emitted by the light emitting devices 144A, 144B, 144C; and fading the light produced by the light emitting devices 144A, 144B, 144C in or out. The sound effects 222 may include, but not be limited to, the generation of sounds corresponding to the playback of digitally pre-recorded audio stored in the controller's non-volatile memory 158.

Volatile memory 160 stores volatile data 168 that is created and/or used by the controller 130 during execution of the operating software 164. Volatile data 168 may include, for example, data corresponding to motion events and/or to output events retrieved from non-volatile memory 158 for temporary use, data corresponding to and/or representative of signals received from accelerometers 140, data corresponding to and/or representative of signals to be generated and communicated to the speaker 136 and light emitting devices 144, data corresponding to status and detected motion event codes, data corresponding to and/or representative of the results of a calculation, intermediate data, and/or other information and/or data.

The controller 130, in accordance with the example embodiment, also comprises speaker 136 and an audio interface 170 connected thereto via signal paths 172, one or more accelerometer interface(s) 174, and one or more light emitting device interface(s) 176. The audio interface 170, accelerometer interface(s) 174, and light emitting device interface(s) 176 are connected, respectively and appropriately, to bus 152 by unidirectional signal paths 178, 180, and 182.

The audio interface 170 receives encoded audio data 246 from processing unit 150, through signal paths 178 and bus 152, corresponding to and/or representative of audio 242 for sound effects 222 to be produced by the controller 130. The audio interface 170 decodes and/or decompresses the encoded audio data 246 associated with such sound effects 222, as necessary or appropriate, and produces electrical signals that are delivered to the speaker 136 by signal paths 172 to cause the speaker 136 to produce appropriate sounds at appropriate times and for appropriate durations. The audio interface 170 comprises a hardware codec and related components according to the example embodiment herein, but it should be understood and appreciated that a software-implemented codec may be used in other embodiments. It should also be understood and appreciated that while audio interface 170 is adapted to process encoded audio data 246, the audio interface 170 is also adapted process non-encoded audio data 246 that may be associated with certain sound effect(s).

The accelerometer interface(s) 174 receive input data and/or signals from accelerometers 140 via electrical conductors 142 corresponding to movements of the garment user's hands and/or arms. Upon receipt of such data and/or signals, the accelerometer interface(s) 174 generate data representative thereof in a form appropriate for use by processing unit 150 and communicate such data to processing unit 150 via signal paths 180. The processing unit 150 may store the processed accelerometer data in volatile memory 160 as volatile data 168 for subsequent use.

The light emitting device interface(s) 176 receive data from processing unit 150 through signal paths 182 corresponding to and/or representative of lighting effects to be emitted by the garment 100. After receiving such data, the light emitting device interface(s) 176 generate appropriate electrical signals corresponding thereto in order to implement the lighting effects and deliver such electrical signals to the proper light emitting devices 144 to cause the light emitting devices 144 to emit appropriate colors of light at appropriate times and for appropriate durations. It should be understood and appreciated that in other embodiments, the light emitting device interface(s) 176 may comprise lighting effect interface(s) that produce light of one or more colors, as appropriate, for communication via optical fiber elements and output at locations similar to those of light emitting devices 144 of the example embodiment described herein.

Additionally, the controller 130 comprises an electrical power source 184 connected to bus 152 via signal path 186 that supplies electrical energy to the various components of the controller 130. The electrical power source 184 generally includes one or more rechargeable or non-rechargeable batteries for storing and supplying the electrical energy, but in other embodiments the electrical power source 184 may comprise one or more electrical conductors connected to a game console or an alternating current adapter connected to an electrical wall outlet and tethered to the garment 100 via electrical conductors.

FIG. 5 displays a partial block diagram representation of the controller's operating software 164 in accordance with the example embodiment. The operating software 164 comprises main software 200, motion event detection software 202, and operating mode software 204. Together with the non-volatile data 166, the main software 200, motion event detection software 202, and operating mode software 204 implement a game played using the garment 100 when executed by the controller's processing unit 150. The processing unit's execution of the main software 200 provides overall management and control functionality for the game and controller 130 and performs branching for operation of the controller 130 according to appropriate operating mode software 204 based at least in part on a motion event detected by the motion event detection software 202 and the operating mode (or operating mode number) associated therewith.

The processing unit's execution of the motion event detection software 202 causes the controller 130 to read and temporarily store data from the garment's accelerometers 140 in volatile memory 160 and to analyze the received accelerometer data using non-volatile data 166 associated with motion events to determine whether movement(s) of the user's arm(s) and/or hand(s) has occurred and, if so, to identify the particular motion event corresponding to such movement(s). If no movement(s) is detected within a pre-determined period of time, the motion event detection software 202 times out to indicate that no movement has been detected.

Execution of the operating mode software 204 by the processing unit 150 causes the controller 130 and/or garment 100 to operate in a particular mode of operation in response to a detected, and respectively associated, motion event. Such operation may cause the controller 130 and/or garment 100 to generate particular sound and/or lighting effect(s) 222, 252, and/or to wait for and respond to one or more subsequent motion events of a pattern of motion events detected and identified by operation of the motion event detection software 202. Thus, when operating according to a certain operating mode in a particular game, the operating mode software 204 may cause the controller 130 to require a user wearing the garment 100 to perform multiple movements of his/her arm(s) and/or hand(s) (perhaps, together, defining a gesture) appropriate for the game in order to cause certain sound and/or lighting effect(s) 222, 252 to be produced. It should be understood and appreciated that operating mode software 204 may cause the controller 130 and/or garment 100 to generate one or more pre-defined sound effect(s) 222, one or more pre-defined lighting effect(s) 252, no sound effect(s) 222, no lighting effect(s) 252, or any combination thereof. It should also be understood and appreciated that operating mode software 204 may cause the controller 130 and/or garment 100 to produce, or not produce, pre-defined sound and/or lighting effect(s) 222, 252 with or without the detection of subsequent motion events being detected by the controller 130.

Figure 6:
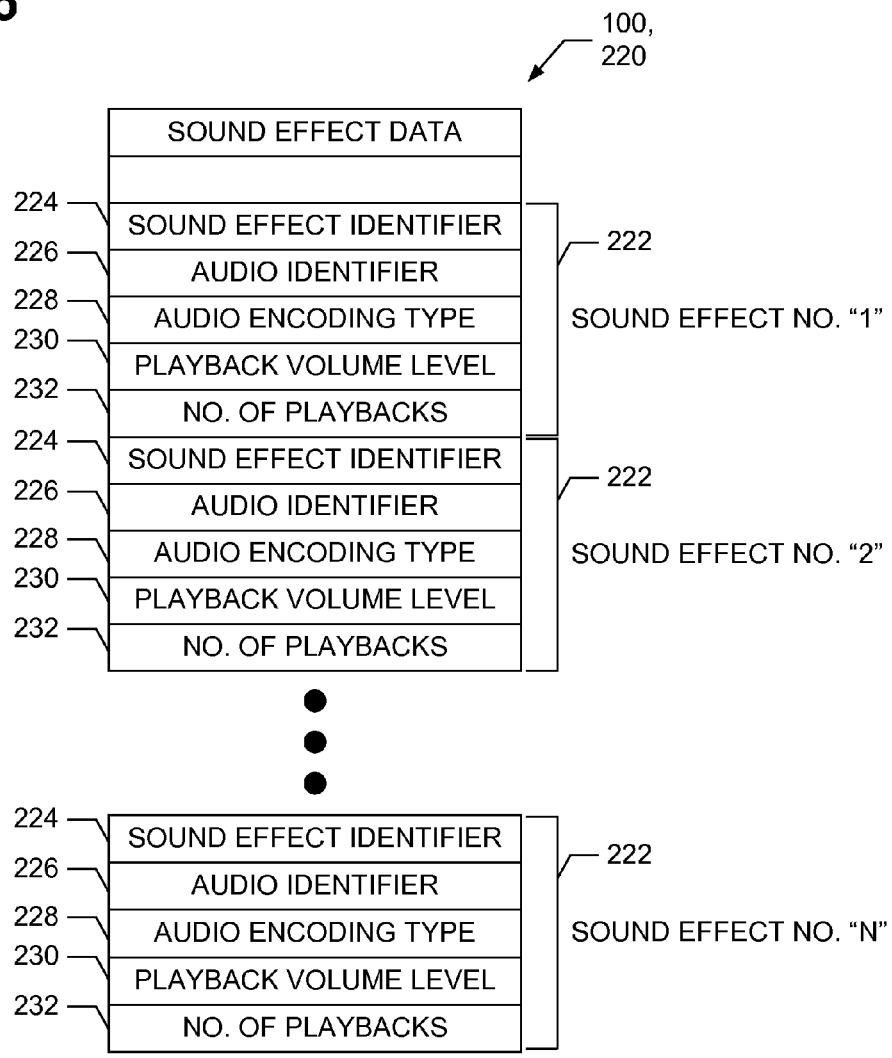
FIG. 6 displays a block diagram representation of sound effect data of the motion-responsive entertainment garment of FIG. 1.

FIG. 6 displays a block diagram representation of sound effect data 220 according to the example embodiment. The sound effect data 220 is associated with and/or representative of pre-defined sound effects 222 that may be used and/or generated in connection with various games capable of being played by a user of the garment 100. The sound effect data 220 is stored as non-volatile data 166 in non-volatile memory 158 and is accessed and used by the controller's processing unit 150 and/or audio interface 170 to produce audible sounds, when appropriate, for games and/or in association with pre-defined movements of the garment user's arm(s) and/or hand(s) detected and identified by the processing unit 150.

The sound effect data 220 associated with each pre-defined sound effect 222 typically includes a sound effect identifier 224 that uniquely identifies the sound effect 222 from all other sound effects 222 that may be generated by the controller 130. Each pre-defined sound effect 222 also typically includes an audio identifier 226 corresponding to particular audio 242 described below with reference to FIG. 7 and identifying such audio 242 for playback by the controller 130 through use of the audio interface 170 and speaker 136. Additionally, each pre-defined sound effect 222 typically includes an audio encoding type 228 that identifies how the encoded audio data 246 of the referenced audio 242 is encoded and, hence, what decoding and/or decompression methods are to be used by the processing unit 150 and/or audio interface 170 for playing back the audio 242. For example, particular audio 242 may be encoded using the ".wav" format/standard and, hence, the corresponding encoded audio data 246 must be decoded according to the ".wav" format/standard by the processing unit 150 and/or audio interface 170 when played back.

In addition, the sound effect data 220 associated with each pre-defined sound effect 222 typically includes a playback volume level 230 and a number of playbacks 232. The playback volume level 230 comprises data utilized by the processing unit 150 and/or audio interface 170 to set the volume level of the sound produced by speaker 136 during playback of the audio 242 associated with the sound effect 222, unless such playback volume level 230 is overridden by the operating software 164. The number of playbacks 232 comprises data identifying the number of times that the audio 242 associated with the sound effect 222 is to be played back by the processing unit 150 and/or audio interface 170 unless overridden by the operating software 164, thereby enabling repeated generation of a sound effect 222.

Figure 7:
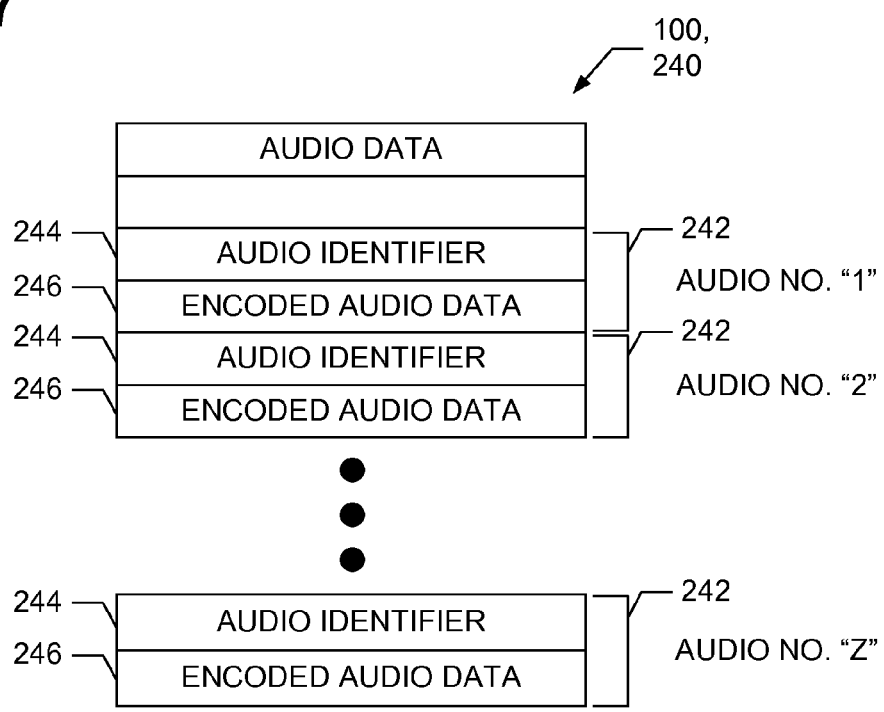
FIG. 7 displays a block diagram representation of audio data of the motion-responsive entertainment garment of FIG. 1.

FIG. 7 displays a block diagram representation of audio data 240 in accordance with the example embodiment. The audio data 240 corresponds to and/or is representative of pre-defined audio 242 that is used to produce pre-defined sound effects 222 as described herein. The audio data 240 is stored as non-volatile data 166 in non-volatile memory 158 and is accessed by the controller's processing unit 150 when the controller 130 is producing a sound effect 222 associated with a game being played by a user of the garment 100.

The audio data 240 for each audio 242 generally comprises an audio identifier 244 that uniquely identifies such audio 242 from all other audio 242 that may be played back by the controller 130. The audio data 240 for each audio 242 also generally comprises encoded audio data 246 that when appropriately decoded and/or decompressed by the processing unit 150 and/or audio interface 170, causes the speaker 136 to generate desired sounds. Such sounds may include and correspond to, for example and not limitation, sounds associated with a spell being cast, sounds associated with thunder or lightening, sounds of explosions, sounds of musical instruments, sounds of nature, sounds of animals, speech, laughs, screams, music, and other sounds used in connection with sound effects 222 for games that are playable by a user of the garment 100.

Figure 8:
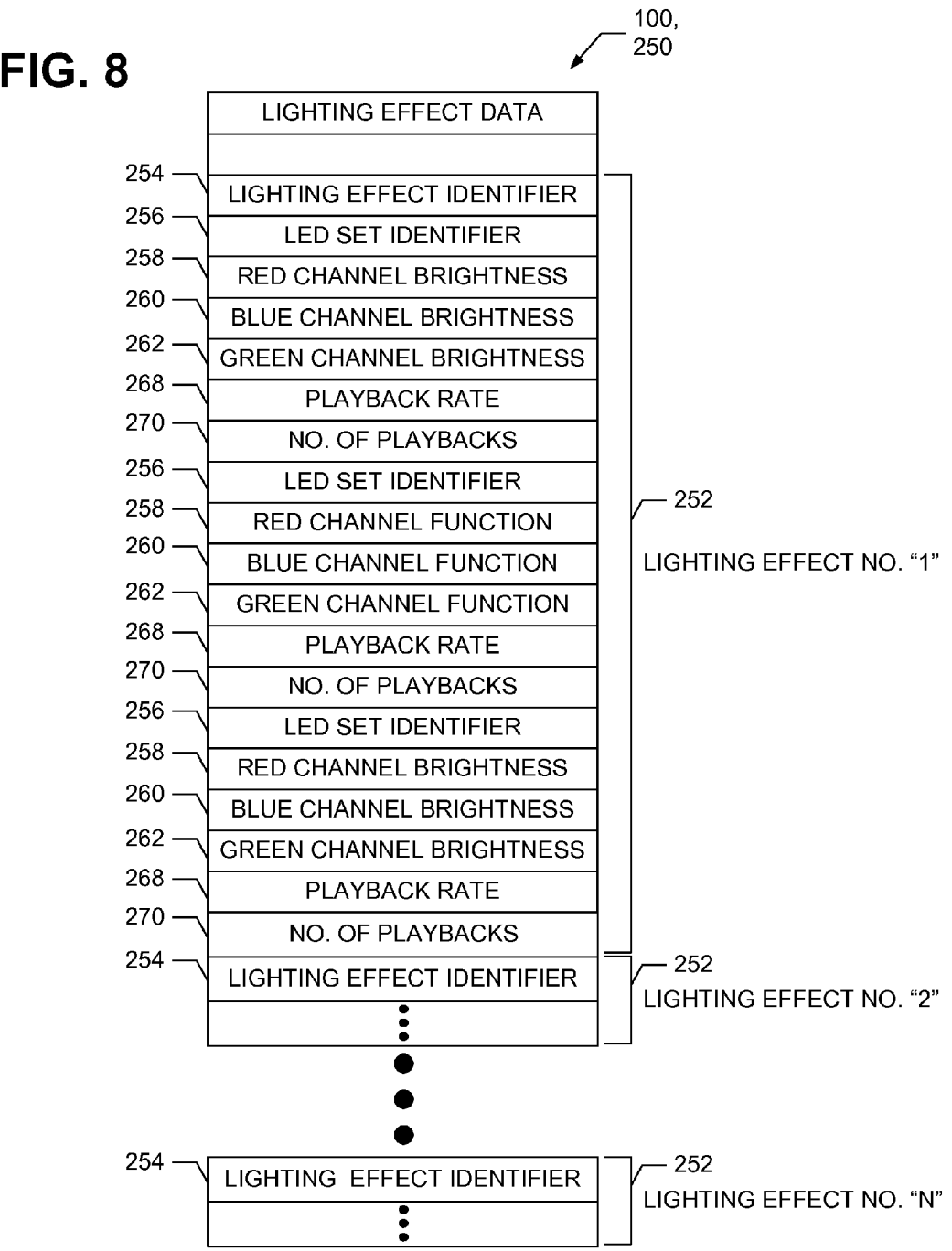
FIG. 8 displays a block diagram representation of lighting effect data of the motion-responsive entertainment garment of FIG. 1.

FIG. 8 displays a block diagram representation of lighting effect data 250 in accordance with the example embodiment described herein. The lighting effect data 250 is associated with and/or representative of pre-defined lighting effects 252 that, similar to the pre-defined sound effects 220, may be used and/or generated in connection with various games capable of being played by a user of the garment 100. The lighting effect data 250 is stored as non-volatile data 166 in non-volatile memory 158 and is accessed by the controller's processing unit 130 to cause the production of light for light emitting devices 144, when appropriate, for games and/or in association with pre-defined movements of the garment user's arm(s) and/or hand(s) detected and identified by the processing unit 150.

The lighting effect data 250 associated with each pre-defined lighting effect 252 typically includes a lighting effect identifier 254 that uniquely identifies the lighting effect 252 from all other lighting effects 252 that may be generated by the controller 130 and garment 100. Each pre-defined lighting effect 252 also typically includes a set of parameters or data for each set of light emitting devices 144 that is used by the processing unit 150 and/or light emitting device interface(s) 176 to cause each set of light emitting devices 144 to generate, or not generate, light in appropriate color(s) and at appropriate times and for appropriate durations.

The lighting effect data 250 for each set of light emitting devices 144 comprises a lighting device set identifier 256 that uniquely identifies a set of light emitting devices 144 of the garment 100 from the other sets of light emitting devices 144 of the garment 100. The lighting effect data 250 for each set of light emitting devices 144 also comprises data or a mathematical function defining the red, blue, and green brightness levels 258, 260, 262 for illuminating the light emitting devices 144. For example, the red, blue and green brightness levels 258, 260, 262 may be defined by an integer or binary number having a value between zero (0) and two hundred fifty-five (255), or may be defined as a mathematical function such as trigonometric function, a polynomial function, a combination thereof, or some other form of mathematical function via which a brightness level is computed for a period of time. Additionally, the lighting effect data 250 for each set of light emitting devices 144 comprises data corresponding to a playback rate 268 and a number of playbacks 270. The processing unit 150 and/or light emitting device interface 176 use the playback rate 268 to determine the period of time during which the respective set of light emitting devices 144 emit light, and the number of playbacks 270 to determine how many times to repeat the emission of light from the respective set of light emitting devices 144.

In use, the garment 100 is put on and worn by the user with the user's arms extending within the sleeve portions 112A, 112B and the user's head present within the hood portion 120. The user then begins to play a game for which the garment 100 and controller 130 are configured by moving the off/on power switch 138 of the garment's controller 130 into its "on" position, thereby powering on and rendering the controller 130 operational under the direction of the operating software 164. Subsequently, the garment 100 and controller 130 operate in accordance with methods implemented by the operating software 164.

Figure 9:
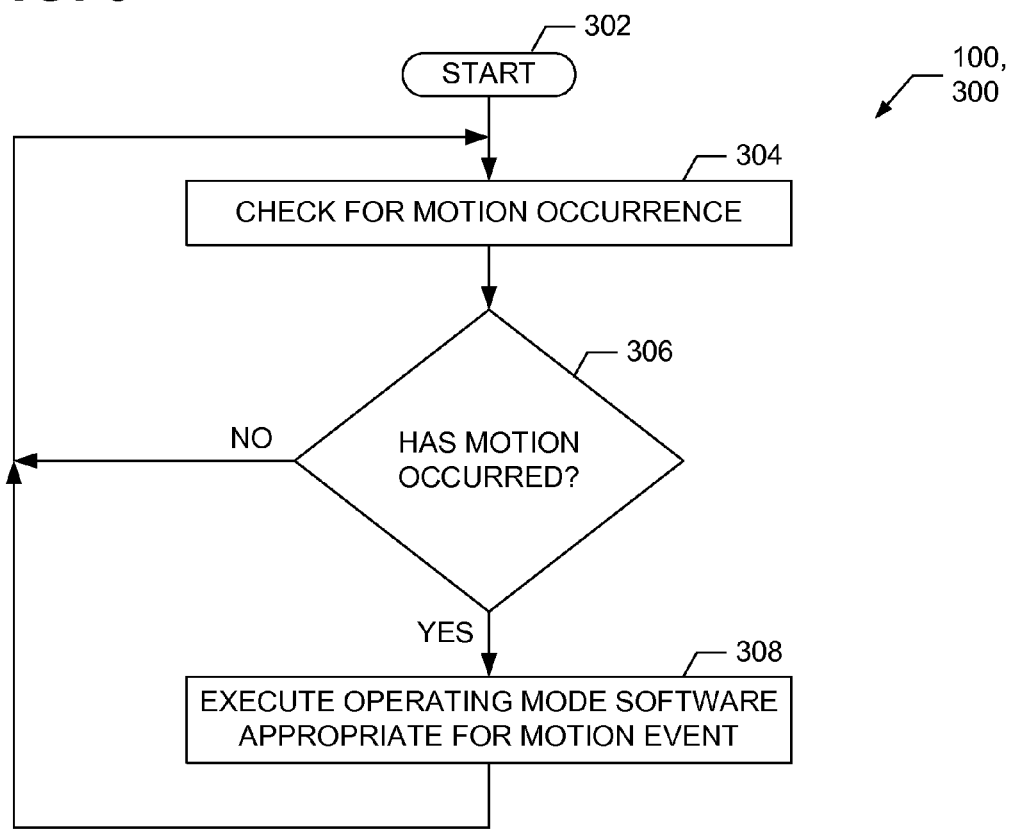
FIG. 9 displays a flowchart representation of a method of operation of the motion-responsive entertainment garment of FIG. 1 implemented in connection with main operating software thereof.

FIG. 9 displays a flowchart representation of a method 300 of operation of the garment 100 implemented at least in part through execution of the main software 200 portion of the garment's operating software 164 by the controller's processing unit 150. After starting game play at step 302 of method 300, the user moves his/her arm(s) and/or hand(s) while playing the game and the garment's sleeve portions 112A, 112B correspondingly move. The garment's accelerometers 140A, 140B move with the sleeve portions 112A, 112B and, at step 304, the processing unit 150 checks for the occurrence of motion by the user's arm(s) and/or hand(s). To do so, the processing unit 150 executes temporarily in accordance with the method 320 and software instructions of the motion event detection software 202. If no motion is occurring or motion has not occurred, the motion event detection software 202 times out. If motion is occurring or has occurred, the motion event detection software 202 indicates that motion has occurred and identifies the particular motion event.

Continuing operation according to method 300 at step 306, the controller's processing unit 150 determines if the motion event detection software 202 timed out, thereby indicating that no motion has occurred. To do so, the processing unit 150 considers a status code appropriately set by the prior operation of the motion event detection software 202. If a time out has occurred, the processing unit 150 loops back to step 304 to again check for the occurrence of motion by the user's arm(s) and/or hand(s). If no time out has occurred, then motion has occurred and at step 308 of method 300, the processing unit 150 begins execution as directed by the operating mode software 204 that is appropriate for the detected motion event as evidenced by a motion event code previously set by operation of the motion event detection software 202.

As described above, a game may include one or more different modes of operation that are implemented by the garment 100 and controller 130 in response to respective motion events. And, in connection with a particular mode, the garment 100 and/or controller 130 may generate particular sound and/or lighting effect(s) 222, 252, and/or wait for and respond to one or more subsequent motion events that are part of a pattern of motion events made during playing of the game. Some example modes of operation are described below with respect to FIGS. 11-13.

After completing operation in accordance with the mode of operation appropriate for the detected motion event, the processing unit 150 loops back to step 304 to check again for the occurrence of a motion event. While playing the game, the user may move his/her arm(s) and/or hand(s) in many different pre-defined movements to appropriately cause, or not cause, the garment 100 and controller 130 to produce corresponding pre-defined output events (including one or more sound and/or lighting effect(s) 222, 252) responsive to such movements. Once the user desires to stop playing the game, the user moves the off/on power switch 138 of the garment's controller 130 into its "off" position, thereby powering down and rendering the controller 130 non-operational.

Figure 10:
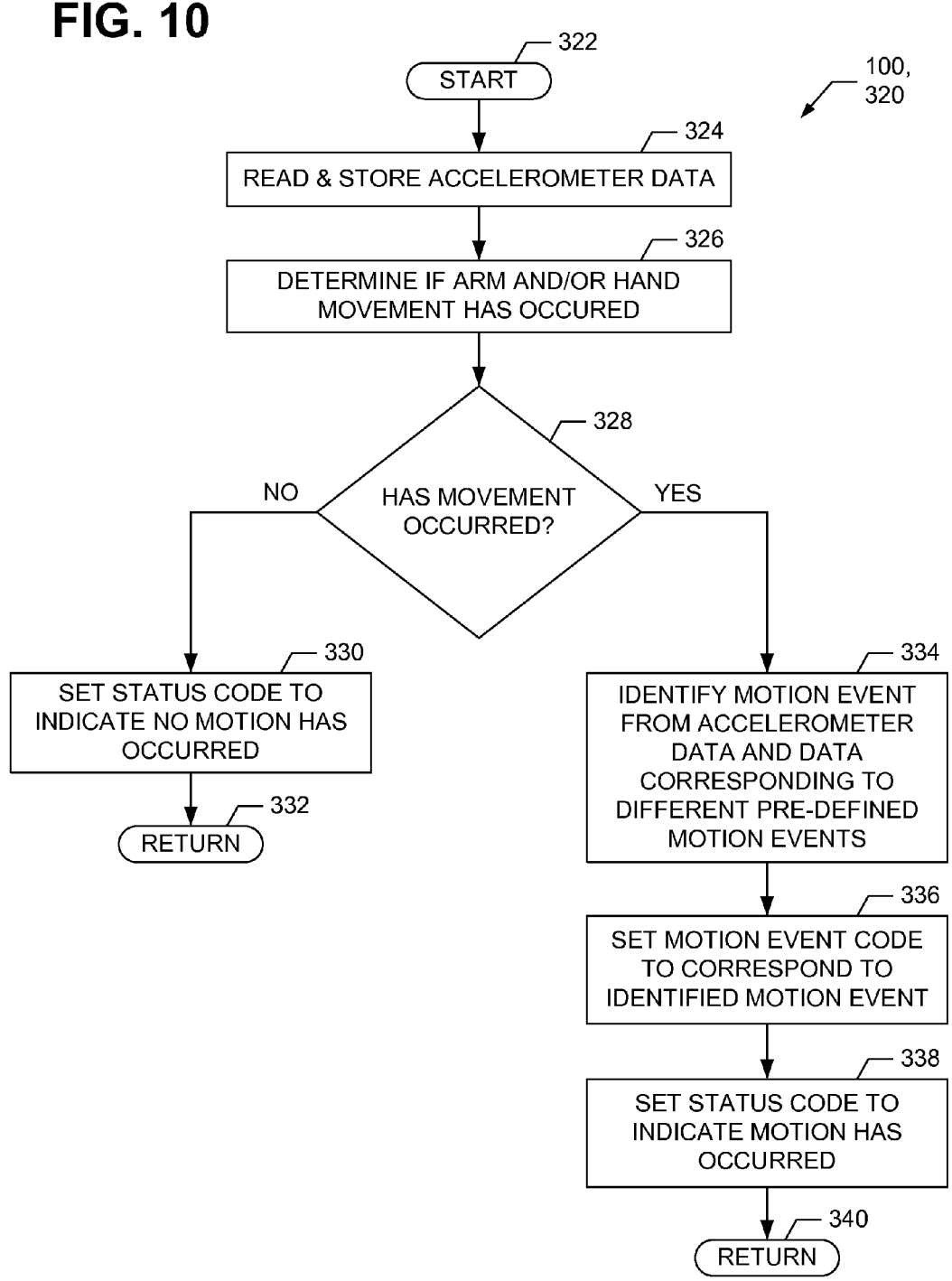
FIG. 10 displays a flowchart representation of a method of operation of the motion-responsive entertainment garment of FIG. 1 implemented in connection with motion event detection software thereof.

FIG. 10 displays a flowchart representation of a method 320 of operation of the garment 100 implemented at least in part through execution of the motion event detection software 202 portion of the garment's operating software 164 by the controller's processing unit 150. Operating in accordance with method 320, the processing unit 150 determines whether the garment's user has moved his/her arm(s) and/or hand(s) and, if so, identifies the motion event, assigns a unique identifier corresponding to and associated with the identified motion event to a motion event code, and sets a status code to indicate the detection of a motion event. If no motion is detected, the processing unit 150 sets a status code to indicate that no motion has been detected.

After starting operation at step 322 of method 320, the processing unit 150 reads accelerometer data from each of the garment's accelerometers 140 via the accelerometer interface 174 and temporarily stores the data in volatile memory 160 as volatile data 168 at step 324. Next, at step 326, the processing unit 150 determines whether movement of the user's arm(s) and/or hand(s) and, therefore, a motion event has occurred. To do so, the processing unit 150 considers and analyzes the read accelerometer data along with prior previously collected accelerometer data. Then, at step 328, if the processing unit 150 decides that motion is occurring or has occurred, the processing unit 150 branches to step 334 of method 320 described below. Alternatively, if the processing unit 150 decides that no motion is occurring or that no motion has occurred, the processing unit 150 sets the status code at step 330 to indicate that no motion has occurred and, at step 332, ceases control over the operation of the garment 100 in accordance with method 320.

At step 334, the processing unit 150 identifies the type of movement and, hence, the motion event performed by the garment user's arm(s) and/or hand(s). In order to do so, the processing unit 150 uses the read accelerometer data, prior accelerometer data, and/or data representative of the pre-defined movements detectable by the controller 130 stored in non-volatile memory 158. The processing unit 150 interprets the accelerometer data corresponding to three-dimensional movements of the user's arm(s) and/or hand(s) and determines whether the movements and rate of movement correspond to a pre-defined movement and, if so, which one. Then, at step 336, the processing unit 150 sets the motion event code to the unique identifier corresponding to the identified motion event and, at step 338, sets the status code to indicate that motion has occurred. Subsequently, at step 340, the processing unit 150 ceases controlling direction of the garment's operation according to method 320.

Figure 11:
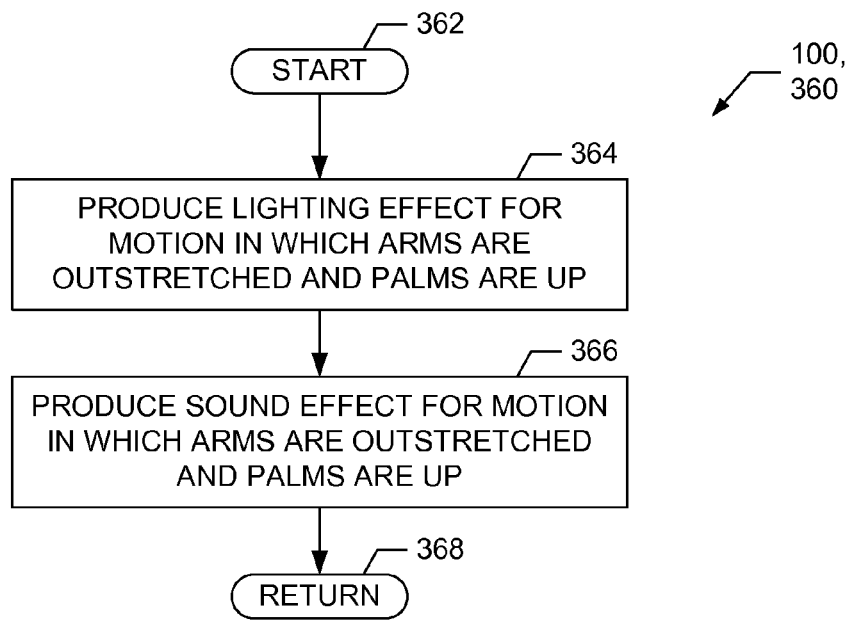
FIG. 11 displays a flowchart representation of a method of operation of the motion-responsive entertainment garment of FIG. 1 implemented in connection with a first example operating mode and corresponding operating mode software thereof.

FIG. 11 displays a flowchart representation of a method 360 of an operating mode of the garment 100, according to the example embodiment, implemented by operating mode software 204 and followed by the garment 100 and controller 130 in response to detection of a particular motion event. For example, the garment 100 and controller 130 might operate in accordance with method 360 when the controller 130 determines that the garment's user has outstretched his/her arms with the palms of his/her hands facing up. The method 346 corresponds to an example of a relatively simple operating mode that is entered into in response to a motion event in which a single lighting effect 252 and a single sound effect 222 are produced by the garment 100, and in which no further motion event is then required by the game being played with the garment 100.

After starting operation according to method 360 at step 362, the processing unit 150, light emitting device interface 176, and light emitting devices 144 produce a specified lighting effect 252 at step 364. Generally, the lighting effect 252 is specified in the operating mode software 204 through use of the lighting effect identifier 254 of the lighting effect data 250 corresponding to the lighting effect 252. To produce the lighting effect 252, the processing unit 150 and light emitting device interface 176 retrieve and utilize the lighting effect data 250 for the specified lighting effect 252 stored in non-volatile memory 158 as non-volatile data 166.

Then, at step 366, the processing unit 150, audio interface 170, and speaker 136 produce a sound effect 222 specified in the operating mode software 204 via the sound effect identifier 224 of the sound effect data 220 associated with the sound effect 222. The processing unit 150 and audio interface 170 produce the sound effect 222 by retrieving and using the sound effect data 220 for the specified sound effect 220 stored in non-volatile memory 158 as non-volatile data 166. After the sound effect 220 has been produced, the processing unit 150 returns direction over the operation of the garment 100 to method 300 at step 368.

Figure 12A:
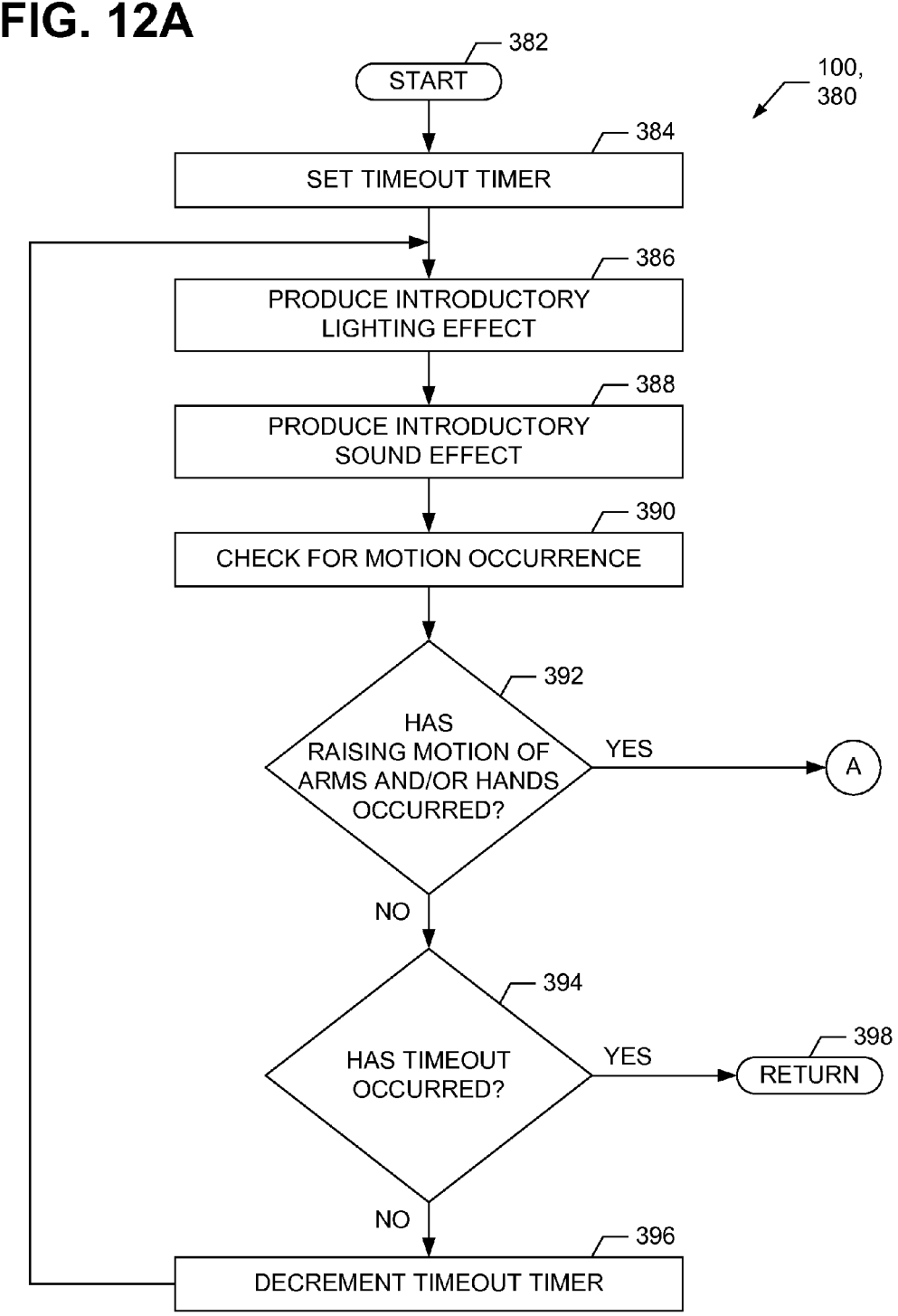
FIGS. 12A and 12B display a flowchart representation of a method of operation of the motion-responsive entertainment garment of FIG. 1 implemented in connection with a second example operating mode and corresponding operating mode software thereof.
Figure 12B:
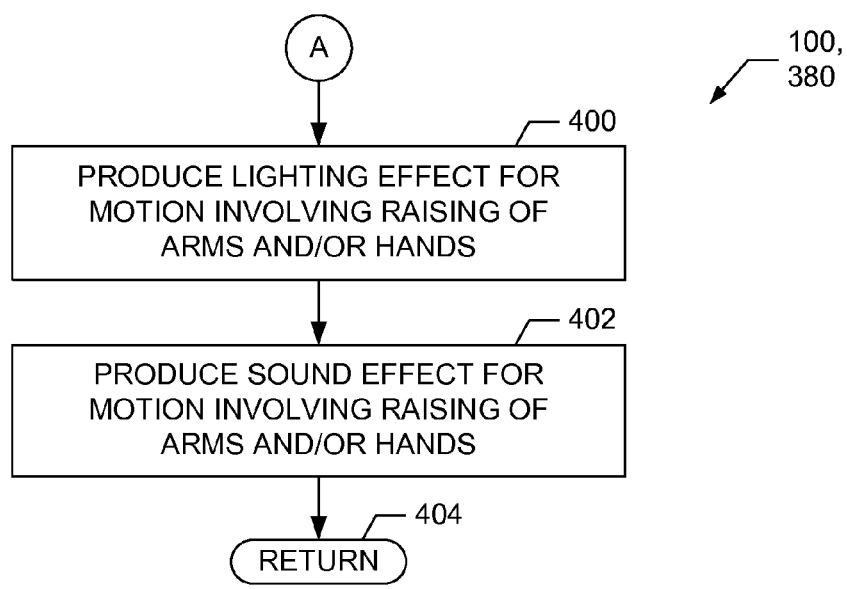

FIGS. 12A and 12B display a flowchart representation of a method 380 of an operating mode of the garment 100 in accordance with the example embodiment described herein. The method 380 is implemented by appropriate operating mode software 204 and followed by the garment 100 and controller 130 in response to detection of a particular motion event made by the garment's user. For example, the garment 100 and controller 130 might operate according to method 380 when the controller 130 detects that the garment's user has lowered his/her arms and hands from a previously raised position. The method 380 corresponds to an example of a more complicated operating mode entered into in response to detection of a motion event and in which multiple sound effects 222 and lighting effects 252 are produced and another motion event is required to be performed by the garment's user in connection with the game, or portion of the game, being played with the garment 100. Thus, by requiring another motion event in addition to the motion event triggering operation according to method 380, the garment 100 requires particular pre-defined motion events to be performed by the garment's user in a particular pattern or sequence (and, hence, requires the making of a gesture comprising the multiple pre-defined motion events) in order to play the game.

After starting operation at step 382 of method 380, the processing unit 150 sets a timeout timer at step 384 to correspond to a maximum amount of time allowed for detecting the subsequent movement of the garment user's arm(s) and/or hand(s) and, hence, the occurrence of the subsequent motion event. The garment's user must perform the subsequent movement within the allowed amount of time in order to continue playing the game in accordance with the present operating mode. Otherwise, operation in accordance with the operating mode and method 380 will end. Use of the timeout timer prevents the controller 130 from endlessly waiting for the garment's user to make the subsequent movement required by the operating mode. While method 380 comprises an example of an operating mode in which a timeout may occur, it should be understood and appreciated that in other example operating modes a timeout timer may not be employed.

Next, at step 386, the processing unit 150, light emitting device interface 176, and light emitting devices 144 produce an introductory lighting effect 252. The introductory lighting effect 252 is specified through use of the lighting effect identifier 254 of the lighting effect data 250 that corresponds to and is associated with the introductory lighting effect 252. To produce the introductory lighting effect 252, the processing unit 150 and light emitting device interface 176 retrieve the lighting effect data 250 for the introductory lighting effect 252 stored in non-volatile memory 158 as non-volatile data 166. The processing unit 150 and light emitting device interface 176 then use the retrieved lighting effect data 250 to generate and communicate electrical signals corresponding to the introductory lighting effect 252 to the appropriate light emitting devices 144.

Proceeding to step 388 of method 380, the processing unit 150, audio interface 170, and speaker 136 produce an introductory sound effect 222 specified via the sound effect identifier 224 of the sound effect data 220 associated with the introductory sound effect 222. The processing unit 150 and audio interface 170 produce the introductory sound effect 222 by retrieving and using the sound effect data 220 for the introductory sound effect 220 stored in non-volatile memory 158 as non-volatile data 166 to generate and communicate electrical signals to the speaker 136 that correspond to the sound effect 222.

At step 390, the processing unit 150 checks to see if another movement of the user's arm(s) and/or hand(s) and, therefore, the other motion event required by the operating mode has occurred. To do so, the processing unit 150 executes temporarily in accordance with the method 320 and software instructions of the motion event detection software 202 as described above with reference to FIG. 10. If no motion is occurring or motion has not occurred, the motion event detection software 202 sets the status code accordingly. If motion is occurring or has occurred, the motion event detection software 202 indicates that motion has occurred by setting the status code to indicate such and identifies the particular motion event by setting the motion event code with an identifier that uniquely identifies the detected motion event.

Upon returning from operation in accordance with method 320, the controller's processing unit 150 determines, at step 392, if the motion event detection software 202 detected the occurrence of the required subsequent motion event which, in this case, involves a raising motion of the garment user's arms and/or hands. To do so, the processing unit 150 first considers the status code to determine if the status code indicates the detection of a motion event. If not, the processing unit 150 advances to step 394 described below. However, if the status code indicates the detection of a motion event, the processing unit 150 next considers the motion event code to determine if the identifier corresponds to the identifier associated with the motion event comprising a raising movement of the garment user's arms and/or hands. If the motion event code so corresponds, the processing unit 150 branches to step 400 of method 380 described below. If the motion event code does not indicate occurrence of the motion event comprising a raising motion of the garment user's arms and/or hands, the processing unit 150 continues operation at step 394 of method 380.

At step 394, the controller's processing unit 150 determines if a time out condition has occurred by checking the timeout timer to see if the timeout timer has reached zero (0). If no time out condition has occurred, the processing unit 150 decrements the timeout timer at step 396 and loops back to step 386 to again produce an introductory lighting effect 252. If a time out condition has occurred (meaning that the required subsequent movement of the user's arms and/or hands has not been successfully performed by the garment's user within the allowed time), the processing unit 150 returns direction over the operation of the garment 100 to method 300 at step 398, thereby terminating operation according to the present operating mode.

If, at step 392, the processing unit 150 determined that the identifier of the motion event code corresponds to the identifier associated with the motion event comprising a raising movement of the garment user's arms and/or hands, the processing unit 150, light emitting device interface 176, and light emitting devices 144 produce a lighting effect 252, at step 400, corresponding to the raising movement using the lighting effect identifier 254 of the lighting effect data 250 that is associated with such lighting effect 252. To produce the lighting effect 252, the processing unit 150 and light emitting device interface 176 retrieve and utilize the lighting effect data 250 for the lighting effect 252 stored in non-volatile memory 158 to generate and communicate electrical signals corresponding to the lighting effect 252 to the appropriate light emitting devices 144.

Then, at step 402, the processing unit 150, audio interface 170, and speaker 136 produce a sound effect 222 corresponding to the raising movement of the garment user's arms and/or hands using the sound effect identifier 224 of the sound effect data 220 associated with such sound effect 222. The processing unit 150 and audio interface 170 produce the sound effect 222 by retrieving and using the sound effect data 220 for the sound effect 220 stored in non-volatile memory 158 as non-volatile data 166 to generate and communicate electrical signals to the speaker 136 that correspond to the sound effect 222. After the sound effect 222 has been produced, the processing unit 150 returns direction over the operation of the garment 100 to method 300 at step 404.

Figure 13B:
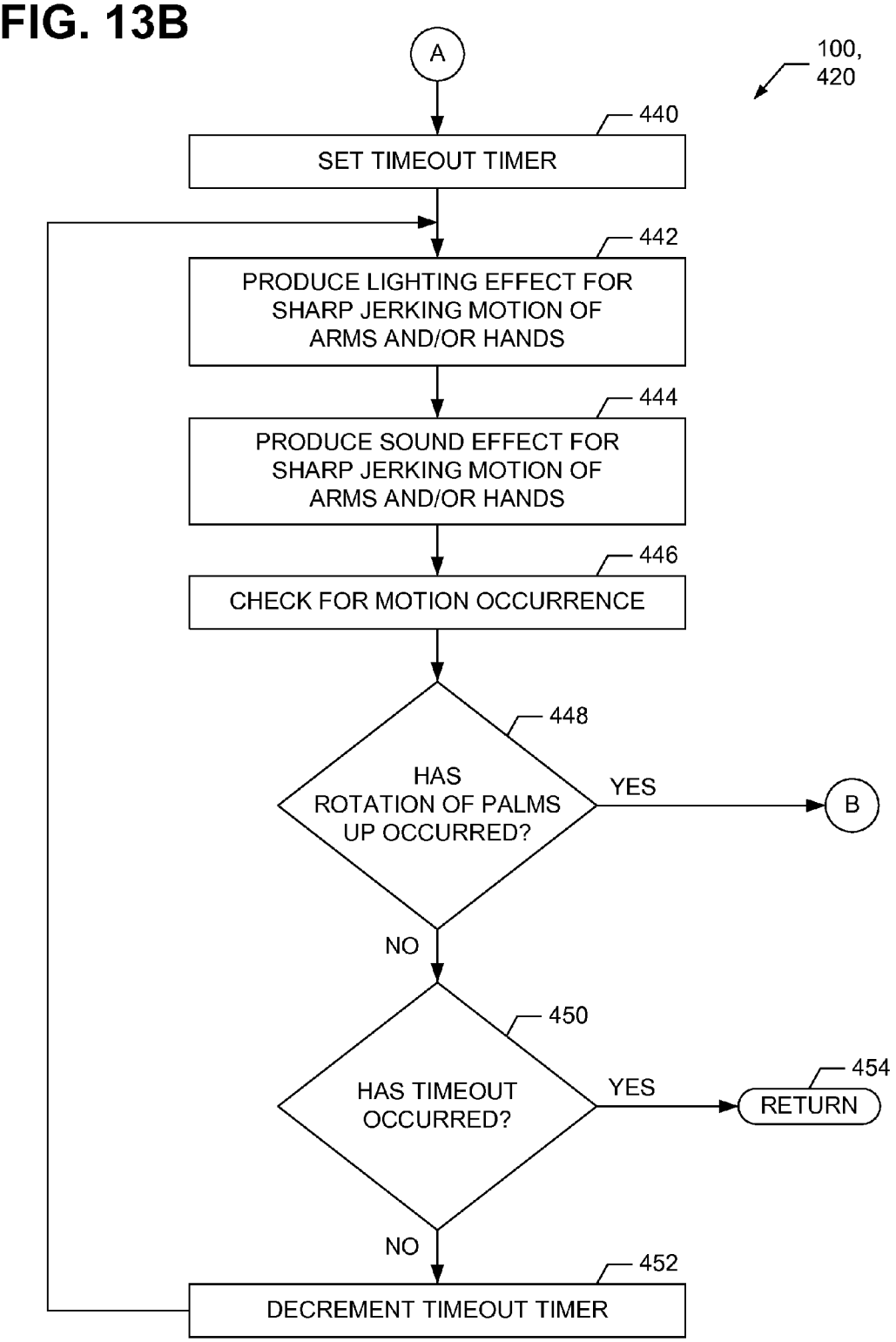
Figure 13C:
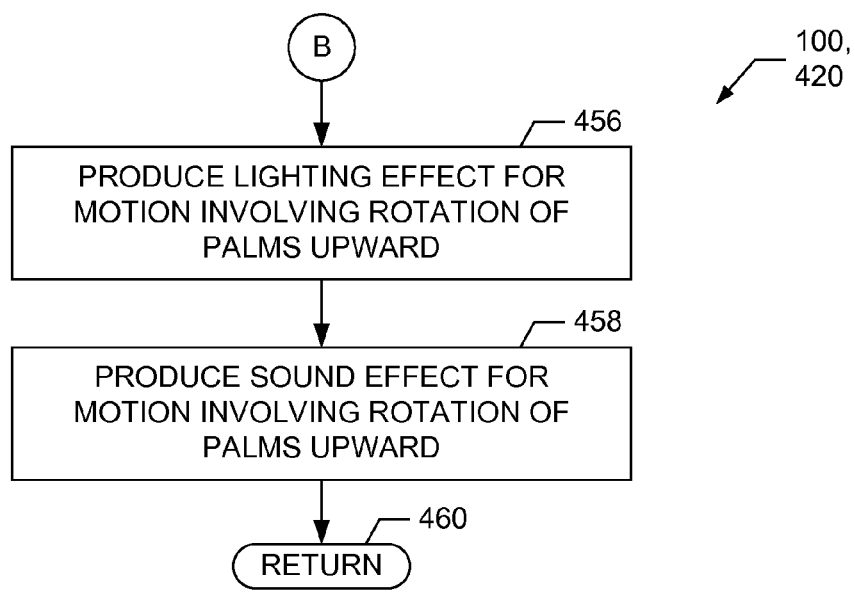

FIGS. 13A-13C display a flowchart representation of a method 420 of an operating mode of the garment 100, according to an example embodiment, implemented by appropriate operating mode software 204 and followed by the garment 100 and controller 130 in response to detection of a particular motion event made by the garment's user. For example, the garment 100 and controller 130 might operate according to method 420 when the controller 130 detects that the garment's user has rotated the palms of his/her hands upward from a previously downward facing position. The method 420 corresponds to an example of a still more complicated operating mode performed in response to detection of a motion event and in which multiple additional motion events are required in connection with the game, or portion of the game, being played with the garment 100. In addition, a sound effect 222 and lighting effect 252 are produced upon the occurrence of and in coordination with each additional motion event. Thus, the garment 100 requires multiple motion events to be performed by the garment's user in a certain pattern or sequence that is more complex than the pattern of movements of method 380.

After starting operation at step 422 of method 420, the processing unit 150 sets a timeout timer at step 424 to correspond to a maximum amount of time allowed for detecting the subsequent movement of the garment user's arm(s) and/or hand(s) and, hence, the occurrence of the subsequent motion event. The garment's user must perform the subsequent movement within the allowed amount of time in order to continue playing the game in accordance with the present operating mode. Otherwise, operation in accordance with the operating mode and method 420 will end. Use of the timeout timer prevents the controller 130 from endlessly waiting for the garment's user to make the subsequent movement required by the operating mode.

Next, at step 426, the processing unit 150, light emitting device interface 176, and light emitting devices 144 produce an introductory lighting effect 252. The introductory lighting effect 252 is specified through use of the lighting effect identifier 254 of the lighting effect data 250 that corresponds to and is associated with the introductory lighting effect 252. To produce the introductory lighting effect 252, the processing unit 150 and light emitting device interface 176 retrieve the lighting effect data 250 for the introductory lighting effect 252 stored in non-volatile memory 158 as non-volatile data 166. The processing unit 150 and light emitting device interface 176 then use the retrieved lighting effect data 250 to generate and communicate electrical signals corresponding to the introductory lighting effect 252 to the appropriate light emitting devices 144.

Continuing at step 428 of method 420, the processing unit 150, audio interface 170, and speaker 136 produce an introductory sound effect 222 specified via the sound effect identifier 224 of the sound effect data 220 associated with the introductory sound effect 222. The processing unit 150 and audio interface 170 produce the introductory sound effect 222 by retrieving and using the sound effect data 220 for the introductory sound effect 220 stored in non-volatile memory 158 as non-volatile data 166 to generate and communicate electrical signals to the speaker 136 that correspond to the sound effect 222.

Then, at step 430, the processing unit 150 checks to see if a movement of the user's arm(s) and/or hand(s) and, therefore, a motion event required by the operating mode has occurred. To do so, the processing unit 150 executes temporarily in accordance with the method 320 and software instructions of the motion event detection software 202 as described above with reference to FIG. 10. If no motion is occurring or motion has not occurred, the motion event detection software 202 sets the status code accordingly. If motion is occurring or has occurred, the motion event detection software 202 indicates that motion has occurred by setting the status code to indicate such and identifies the particular motion event by setting the motion event code with an identifier that uniquely identifies the detected motion event.

Upon returning from operation in accordance with method 320, the controller's processing unit 150 determines, at step 432, if the motion event detection software 202 detected the occurrence of the required subsequent motion event which, in this case, involves a sharp jerking motion of the garment user's arms and/or hands. To do so, the processing unit 150 first considers the status code to determine if the status code indicates the detection of a motion event. If not, the processing unit 150 advances to step 434 described below. However, if the status code indicates the detection of a motion event, the processing unit 150 next considers the motion event code to determine if the identifier corresponds to the identifier associated with the motion event comprising a sharp jerking movement of the garment user's arms and/or hands. If the motion event code so corresponds, the processing unit 150 branches to step 440 of method 420 described below. If the motion event code does not indicate occurrence of the motion event comprising a sharp jerking motion of the garment user's arms and/or hands, the processing unit 150 continues operation at step 434 of method 420.

At step 434, the controller's processing unit 150 determines if a time out condition has occurred by checking the timeout timer to see if the timeout timer has reached zero (0). If no time out condition has occurred, the processing unit 150 decrements the timeout timer at step 436 and loops back to step 426 to again produce an introductory lighting effect 252. If a time out condition has occurred (meaning that the required subsequent movement of the user's arms and/or hands has not been successfully performed by the garment's user within the allowed time), the processing unit 150 returns direction over the operation of the garment 100 to method 300 at step 438, thereby terminating operation according to the present operating mode.

If, at step 432, the processing unit 150 determined that the identifier of the motion event code corresponds to the identifier associated with the motion event comprising a sharp jerking movement of the garment user's arms and/or hands, the processing unit 150 sets a timeout timer at step 440 to correspond to a maximum amount of time allowed for detecting a subsequent rotation (and, hence, the occurrence of the subsequent motion event) of the palms of the garment user's hands from facing downward to facing upward. Then, at step 442, the processing unit 150, light emitting device interface 176, and light emitting devices 144 produce a lighting effect 252 corresponding to the sharp jerking movement using the lighting effect identifier 254 of the lighting effect data 250 that is associated with such lighting effect 252. To produce the lighting effect 252, the processing unit 150 and light emitting device interface 176 retrieve and utilize the lighting effect data 250 for the lighting effect 252 stored in non-volatile memory 158 to generate and communicate electrical signals corresponding to the lighting effect 252 to the appropriate light emitting devices 144.

Subsequently, at step 444, the processing unit 150, audio interface 170, and speaker 136 produce a sound effect 222 corresponding to the sharp jerking movement of the garment user's arms and/or hands using the sound effect identifier 224 of the sound effect data 220 associated with such sound effect 222. The processing unit 150 and audio interface 170 produce the sound effect 222 by retrieving and using the sound effect data 220 for the sound effect 220 stored in non-volatile memory 158 as non-volatile data 166 to generate and communicate electrical signals to the speaker 136 that correspond to the sound effect 222.

Proceeding to step 446, the processing unit 150 checks to see if another movement of the user's arm(s) and/or hand(s) and, therefore, another motion event required by the operating mode has occurred. To do so, the processing unit 150 executes temporarily in accordance with the method 320 and software instructions of the motion event detection software 202 as described above with reference to FIG. 10. If no motion is occurring or motion has not occurred, the motion event detection software 202 sets the status code accordingly. If motion is occurring or has occurred, the motion event detection software 202 indicates that motion has occurred by setting the status code to indicate such and identifies the particular motion event by setting the motion event code with an identifier that uniquely identifies the detected motion event.

Upon returning from operation in accordance with method 320, the controller's processing unit 150 determines, at step 448, if the motion event detection software 202 detected the occurrence of the required subsequent motion event which, in this case, involves a rotation of the palms of the garment user's hands from facing downward to facing upward. To do so, the processing unit 150 first considers the status code to determine if the status code indicates the detection of a motion event. If not, the processing unit 150 advances to step 450 described below. However, if the status code indicates the detection of a motion event, the processing unit 150 next considers the motion event code to determine if the identifier corresponds to the identifier associated with the motion event comprising a rotational movement of the palms of the garment user's to face upward. If the motion event code so corresponds, the processing unit 150 branches to step 456 of method 420 described below. If the motion event code does not indicate occurrence of the motion event comprising a rotational motion of the palms of the garment user's hands to face upward, the processing unit 150 continues operation at step 450 of method 420.

At step 450, the controller's processing unit 150 determines if a time out condition has occurred by checking the timeout timer to see if the timeout timer has reached zero (0). If no time out condition has occurred, the processing unit 150 decrements the timeout timer at step 452 and loops back to step 442 to again produce the lighting effect 252 for the sharp jerking movement of the user's arms and/or hands. If a time out condition has occurred (meaning that the required subsequent movement of the user's arms and/or hands has not been successfully performed by the garment's user within the allowed time), the processing unit 150 returns direction over the operation of the garment 100 to method 300 at step 454, thereby terminating operation according to the present operating mode.

If, at step 448, the processing unit 150 determined that the identifier of the motion event code corresponds to the identifier associated with the motion event comprising a rotational movement of the palms of the garment user's hands to face upward, the processing unit 150, light emitting device interface 176, and light emitting devices 144 produce a lighting effect 252, at step 400, corresponding to the rotational movement using the lighting effect identifier 254 of the lighting effect data 250 that is associated with such lighting effect 252. To produce the lighting effect 252, the processing unit 150 and light emitting device interface 176 retrieve and utilize the lighting effect data 250 for the lighting effect 252 stored in non-volatile memory 158 to generate and communicate electrical signals corresponding to the lighting effect 252 to the appropriate light emitting devices 144.

Then, at step 458, the processing unit 150, audio interface 170, and speaker 136 produce a sound effect 222 corresponding to the rotational movement of the garment user's hands using the sound effect identifier 224 of the sound effect data 220 associated with such sound effect 222. The processing unit 150 and audio interface 170 produce the sound effect 222 by retrieving and using the sound effect data 220 for the sound effect 220 stored in non-volatile memory 158 as non-volatile data 166 to generate and communicate electrical signals to the speaker 136 that correspond to the sound effect 222. After the sound effect 222 has been produced, the processing unit 150 returns direction over the operation of the garment 100 to method 300 at step 460.

While playing the game the user may move his/her arm(s) and/or hand(s) in many different movements and movement patterns, thereby causing the garment 100 to produce corresponding different pre-defined output events (including sound and/or lighting effect(s) 222, 252) for such movements and movement patterns. Once the user desires to stop playing the game, the user moves the off/on power switch 138 of the garment's controller 130 into its "off" position, thereby powering down and rendering the controller 130 non-operational.

It should be appreciated that the controller's non-volatile memory 158 may store data corresponding to multiple pre-defined movements and multiple pre-defined output events (and their sound and/or lighting effects 222, 252) associated with such movements. Thus, the garment 100 of the example embodiment may be used in connection with multiple games that may be played by the user and that may involve the user making many different gestures of his/her arms and/or hands. Additionally, it should be appreciated that the garment 100 may be manufactured with different fabrics, including without limitation, fabrics having certain designs or symbols printed or formed on the outer surface thereof.

In one such game in which the user pretends to be a wizard, the garment 100 may additionally comprise designs or symbols commonly associated with wizardry. After putting the garment 100 on and moving the controller's off/on power switch 138 into the "on" position, the user begins to play the game. During play, the user may move his/her hands in a certain movement or gesture corresponding to the casting of a spell on another game participant or thing. Upon identifying that such movement corresponds to a pre-defined motion event stored in the controller's non-volatile memory 158 for the casting of a spell, the processing unit 150 retrieves the data representing pre-defined output events (and sound and/or lighting effect(s) 222, 252 thereof) associated with the motion event and causes the light emitting devices 144A, 144B, 144C and/or speaker 136 to produce the lighting and/or sound effect(s) 252, 222 in accordance with the data retrieved from the non-volatile memory 158. Such pre-defined output events may include lighting and flashing of light emitting devices 144A, 144B near the garment's cuffs 118A, 118B to produce a "fireball" effect as if a fireball were being generated by the user's hands and directed toward the subject of the spell being cast.

As the user finishes casting the spell (and finishes moving his/her arms and/or hands according to the casting of a spell gesture), the controller's processing unit 150 causes the light emitting devices 144C located in the garment's hood portion 120 near opening 122 to light up for a brief period of time in accordance with another of the pre-defined output events associated with the casting of spell gesture. Finally, the controller's processing unit 150 causes the speaker 136 to produce a "fireball" blast sound effect 222 corresponding to the last of the pre-defined output events associated with the casting of spell gesture. It should be appreciated that many different pre-defined movements and gestures may be associated with the wizard game and that the garment 100 may produce one, many, or no different pre-defined sound and/or effects 222, 252 that are associated with each such movement or gesture.

While the garment 100 of the example embodiment described herein is generally used in connection with games not requiring other implements or devices, a substantially similar garment having a controller with wireless communication capability may be used in other example embodiments to communicate data corresponding to detected movements of the user's arms and/or hands to a console or computing device. In response to receiving such data, the console or computing device may cause a display device to display certain images or video and/or a sound generation device to produce sounds, all associated with the detected movements. Additionally, it should be appreciated that similar garments having a controller with wireless communication capability may be used for interaction with other types of games, entertainment, or exercise programs.

Whereas the present invention has been described in detail above with respect to an example embodiment thereof, it should be appreciated that variations and modifications might be effected within the spirit and scope of the present invention, as described herein before and as defined in the appended claims.

What is claimed is:

1. A garment for wearing by a user during and in connection with the playing of a game, said garment comprising:
   a body portion for receiving the torso of the body of the user during the user's playing of a game;
   a sleeve portion attached to and extending from said body portion for receiving an arm of the user during the user's playing of the game, said sleeve portion defining an opening at an end thereof distant from said body portion and from which a hand of the user may protrude;
   an accelerometer secured to and within said sleeve portion near said end thereof, said accelerometer being configured to generate data representative of a movement of the arm of the user during the user's playing of the game;
   a controller operative to process said data representative of the movement of the arm of the user generated by said accelerometer and to determine whether the movement corresponds to a pre-defined movement associated with the game; and
   a lighting emitting device operative to produce a pre-defined lighting effect in response to a determination by the controller that the movement of the arm of the user corresponds to the pre-defined movement associated with the game, said light emitting device being secured to an inner surface of said sleeve portion near said end of said sleeve portion such that said pre-defined lighting effect is visible through said opening at said end of said sleeve portion.

2. The garment of claim 1, wherein said pre-defined lighting effect includes light emission by said light emitting device for a pre-defined period of time.

3. The garment of claim 1, wherein said pre-defined lighting effect includes light emission by said light emitting device according to a pre-defined pattern of light emission.

4. The garment of claim 1, wherein said pre-defined lighting effect includes light emission by said light emitting device of a single color.

5. The garment of claim 1, wherein said pre-defined lighting effect includes light emission by said light emitting device of multiple colors.

6. The garment of claim 1, wherein said light emitting device comprises a first light emitting device and said pre-defined lighting effect comprises a first pre-defined lighting effect, wherein said garment further comprises a hood portion attached to and extending from said body portion for receiving the head of the user during the user's playing of the game, said hood portion defining an opening through which the face of the user may be visible during the user's playing of the game, and wherein said garment further comprises a second light emitting device operative to produce a second pre-defined lighting effect in response to the determination by the controller that the movement of the arm of the user corresponds to the pre-defined movement associated with the game, said second light emitting device being secured to an inner surface of said hood portion near said opening of said hood portion.

7. The garment of claim 6, wherein said controller is configured to cause said first pre-defined lighting effect and said second pre-defined lighting effect to be produced in a pre-defined sequence.

8. The garment of claim 6, wherein said controller is configured to cause said first pre-defined lighting effect and said second pre-defined lighting effect to be produced for a concurrent period of time.

9. The garment of claim 6, wherein said controller is configured to cause repeating of said first pre-defined lighting effect.

10. The garment of claim 6, wherein said controller is configured to cause repeating of said second pre-defined lighting effect.

11. The garment of claim 6, wherein said first pre-defined lighting effect is different from said second pre-defined lighting effect.

12. The garment of claim 1, wherein said accelerometer comprises a single axis accelerometer.

13. The garment of claim 1, wherein said accelerometer comprises a multi-axis accelerometer.

14. The garment of claim 1, wherein said controller is further operative to produce a pre-defined sound effect in response to a determination by the controller that the movement of the arm of the user corresponds to the pre-defined movement associated with the game.

15. The garment of claim 14, wherein said pre-defined sound effect and said pre-defined lighting effect are produced for a concurrent period of time.

16. A garment for wearing by a user during and in connection with the playing of a game, said garment comprising:
   a body portion for receiving the torso of the body of the user during the user's playing of a game;
   a hood portion attached to and extending from said body portion for receiving the head of the user during the user's playing of the game, said hood portion defining an opening through which the face of the user may be visible during the user's playing of the game;
   an accelerometer configured to generate data representative of a movement of the an arm of the user during the user's playing of the game;
   a controller operative to process said data representative of the movement of the arm of the user generated by said accelerometer and to determine whether the movement corresponds to a pre-defined movement associated with the game; and
   a lighting emitting device operative to produce a pre-defined lighting effect in response to a determination by the controller that the movement of the arm of the user corresponds to the pre-defined movement associated with the game, said light emitting device being secured to an inner surface of said hood portion near said opening of said hood portion.

17. The garment of claim 16, wherein said pre-defined lighting effect includes light emission by said light emitting device for a pre-defined period of time.

18. The garment of claim 16, wherein said pre-defined lighting effect includes light emission by said light emitting device according to a pre-defined pattern of light emission.

19. A garment for wearing by a user during and in connection with the playing of a game, said garment comprising:
   a body portion for receiving the torso of the body of the user during the user's playing of a game;
   a sleeve portion attached to and extending from said body portion for receiving an arm of the user during the user's playing of the game, said sleeve portion defining an opening at an end thereof distant from said body portion and from which a hand of the user may protrude;
   an accelerometer secured to and within said sleeve portion near said end thereof, said accelerometer being configured to generate data representative of a movement of the arm of the user during the user's playing of the game;

a controller operative to process said data representative of the movement of the arm of the user generated by said accelerometer and to identify which pre-defined movement of a plurality of pre-defined movements associated with the game that the movement corresponds to; and a plurality of light emitting devices operative to produce at least one pre-defined lighting effect in response to an identification by the controller that the movement of the arm of the user corresponds to a particular pre-defined movement of the plurality of pre-defined movements associated with the game, said light emitting devices of said plurality of light emitting devices being secured to an inner surface of said sleeve portion near said end of said sleeve portion such that said pre-defined lighting effect is visible through said opening at said end of said sleeve portion.

20. The garment of claim 19, wherein said controller is adapted to store at least one pre-defined lighting effect in association with each of the plurality of pre-defined movements associated with the game.

\* \* \* \* \*